(12) United States Patent
Marbach

(10) Patent No.: US 11,708,988 B2
(45) Date of Patent: Jul. 25, 2023

(54) CONTROL OF HEAT EXCHANGE

(71) Applicant: Siemens Schweiz AG, Zürich (CH)

(72) Inventor: Kuno Marbach, Emmenbrücke (CH)

(73) Assignee: SIEMENS SCHWEIZ AG, Zurich (CH)

(*) Notice: Subject to any disclaimer, the term of this patent is extended or adjusted under 35 U.S.C. 154(b) by 0 days.

(21) Appl. No.: 17/493,948

(22) Filed: Oct. 5, 2021

(65) Prior Publication Data
US 2022/0107107 A1 Apr. 7, 2022

(30) Foreign Application Priority Data

Oct. 6, 2020 (EP) .................................... 20200221

(51) Int. Cl.
*F24F 11/83* (2018.01)
*F24F 11/46* (2018.01)
*F24F 11/64* (2018.01)
*G05B 15/02* (2006.01)
*F24F 140/20* (2018.01)

(52) U.S. Cl.
CPC .............. *F24F 11/46* (2018.01); *F24F 11/64* (2018.01); *F24F 11/83* (2018.01); *G05B 15/02* (2013.01); *F24F 2140/20* (2018.01)

(58) Field of Classification Search
CPC ............ F24F 11/46; F24F 11/64; F24F 11/83; F24F 2140/20; G05B 15/02; F24D 2220/0264; F24D 19/1048; F24D 19/1015; G05D 23/1919
See application file for complete search history.

(56) References Cited

U.S. PATENT DOCUMENTS

| 2009/0090498 A1* | 4/2009 | Okada ..................... F28F 27/00 165/299 |
| 2019/0018432 A1 | 4/2019 | Petry ........................ G05D 7/06 |
| 2020/0241577 A1* | 7/2020 | Fread ................... F24D 19/1006 |

(Continued)

FOREIGN PATENT DOCUMENTS

| DE | 10 2014 102 274 | 8/2015 | ............. H01L 51/50 |
| EP | 3 650 761 | 5/2002 | ............. F24D 19/10 |
| EP | 3 115 703 | 1/2017 | ............. F24D 19/10 |

(Continued)

*Primary Examiner* — Michael W Choi
(74) *Attorney, Agent, or Firm* — Slayden Grubert Beard PLLC

(57) ABSTRACT

Various embodiments include a method of controlling heat exchange via a terminal unit of a terminal-side circuit of a system for HVAC with a source-side circuit coupled to the terminal-side circuit comprising: reading a terminal-side supply temperature signal; producing a supply temperature from the terminal-side supply temperature signal; estimating a percentage demand signal as a function of the supply temperature; estimating an actual demand for power by rescaling a value of maximum available power by the percentage demand signal; comparing the actual demand for power to the value of maximum available power; and if the actual demand for power exceeds the value of maximum available power: producing a first flow control signal based on the value of maximum available power; and controlling a flow of a fluid through the source-side circuit based on the first flow control signal.

13 Claims, 9 Drawing Sheets

(56) References Cited

U.S. PATENT DOCUMENTS

2020/0348064 A1* 11/2020 Takenaka .................. F24F 11/49
2021/0140695 A1* 5/2021 Terzic ................... F25B 49/027

FOREIGN PATENT DOCUMENTS

| EP | 3 168 541 | 5/2017 | ............ F24D 19/10 |
| EP | 3 428 767 | 1/2019 | ............ G05D 16/00 |
| WO | 2012 095558 | 7/2012 | ............ F24D 19/10 |

* cited by examiner

CONTROL OF HEAT EXCHANGE

CROSS-REFERENCE TO RELATED APPLICATIONS

This application claims priority to EP Application No. 20200221.8 filed Oct. 6, 2020, the contents of which are hereby incorporated by reference in their entirety.

TECHNICAL FIELD

The present disclosure relates to HVAC systems. Various embodiments of the teachings herein include methods and/or system for control of heat exchange within a system for heating and/or ventilation and/or air-conditioning. More specifically, the present disclosure substantially limits heat exchange within a space of a residential and/or commercial and/or industrial site.

BACKGROUND

Installations for heating and/or ventilation and/or air-conditioning (HVAC) are commonly made up of a plurality of circuits. Each circuit comprises one or several terminal units to provide heating and/or cooling to various parts of a building. Terminal units can be heating devices and/or cooling devices. A terminal unit of a domestic heating system can be a heat exchanger such as a radiator. Chilled beams and/or chilled ceilings can be terminal units of a cooling system.

Factors such as pipe cross-sections, valve characteristics, positions of terminal units within the distribution network etc. affect the flow through the circuits of a HVAC installation. These factors yield hydraulic resistances that vary throughout the system. Hydraulic resistances relate pressure drop to flow of a heating medium and/or to flow of a coolant.

HVAC installations such as heating systems often require hydronic balancing. Hydronic balancing overcomes issues due to different hydraulic resistances of the circuits of a HVAC installation. Hydronic balancing of heating installations of commercial and/or residential and/or industrial sites ensures that each circuit of a system experiences adequate flow. That said, hydronic balancing is generally performed on a site as designed and/or as built. Since the hydraulic resistances of a HVAC installation vary throughout operation, flow through the terminal units of an installation can become inadequate and/or incorrect over time.

Also, transients within HVAC circuits can cause valve controllers of local heat exchangers to open positions of their valves. Those valve positions can in practice exceed the limits of what is necessary to comply with a demand for heating or for cooling. Excessive flow through the terminal units of the HVAC circuit results in waste of power. Excessive flow through the terminal units of the HVAC circuit can also result in additional wear of the moving parts of a valve.

A position of a valve of a terminal unit is determined in accordance with EP3428767B1 from a set point value and from a default flow rate. Determination of the position of the valve involves an opening curve of the valve. The valve assembly of EP3428767B1 affords determinations of valve positions at flow rates that are substantially zero. The valve assembly of EP3428767B1 also affords determinations of valve positions after the design stage of a commercial and/or residential and/or industrial site. The determined valve positions do, however, depend on a default flow rate. That default flow rate can be inadequate because hydraulic resistances can change over time.

In some systems, limit positions are determined for each of the valves of the heat exchangers of a HVAC installation. The determination of limit positions involves temperature measurements and temperature rise quantities derived from the temperature measurements. Determinations of limit positions and of flow settings of valves in accordance with EP3115703B1 can be carried out after the design stage of a building.

Valves for HVAC systems have lately become commercially available that include heat meters. These valves provide measurements of flow of a heating and/or cooling medium. They also provide measurements of supply temperatures and/or return temperatures. An amount of heat dissipated by a terminal unit can then be estimated and/or determined based on such measures of flow and of temperature. Valves including heat meters and processors to enable such determinations are sometimes referred to as smart valves.

SUMMARY

The instant disclosure introduces a control algorithm to limit heat exchange via a terminal unit of a HVAC system. In so doing, a terminal unit such as a radiator or a chilled beam is controlled based on a supply temperature associated with the terminal unit. The algorithm mitigates excessive flow through such terminal units and limits ramifications of transients within HVAC circuits. For example, some embodiments include a method of controlling heat exchange via a terminal unit (10-12) of a terminal-side circuit (10-12, 19) of a system for heating and/or ventilation and/or air-conditioning, the system for heating and/or ventilation and/or air-conditioning also comprising a source-side circuit (1, 2, 17, 18, 20, 21) coupled to the terminal-side circuit (10-12, 19), the method comprising the steps of: reading a terminal-side supply temperature signal indicative of a supply temperature associated with the terminal unit (10-12); producing a terminal-side measure of supply temperature from the terminal-side supply temperature signal; estimating a percentage demand signal as a function of the terminal-side measure of supply temperature; estimating an actual demand for power by rescaling a value of maximum available power by the percentage demand signal; comparing the actual demand for power to the value of maximum available power; if the actual demand for power exceeds the value of maximum available power: producing a first flow control signal based on the value of maximum available power; and controlling a flow of a fluid through the source-side circuit (1, 2, 17, 18, 20, 21) in accordance with the first flow control signal.

In some embodiments, the method further comprises using a cooling curve to estimate the percentage demand signal as a function of the terminal-side measure of supply temperature.

In some embodiments, the method further comprises using a heating curve to estimate the percentage demand signal as a function of the terminal-side measure of supply temperature.

In some embodiments, the method further comprises: reading a set point signal indicative of a temperature set point; producing a temperature set point from the set point signal; and estimating a percentage demand signal as a function of the terminal-side measure of supply temperature and as a function of the temperature set point.

In some embodiments, the method further comprises controlling the flow of the fluid through the source-side circuit (1, 2, 17, 18, 20, 21) in accordance with the first flow control signal such that an amount of heat transferred via the source-side circuit (1, 2, 17, 18, 20, 21) corresponds to the value of maximum available power.

In some embodiments, the method further comprises: if the actual demand for power is less than the value of maximum available power: producing a second flow control signal based on the actual demand for power; and controlling the flow of the fluid through the source-side circuit (1, 2, 17, 18, 20, 21) in accordance with the second flow control signal.

In some embodiments, the system for heating and/or ventilation and/or air-conditioning comprises a heat exchanger (16) coupling the source-side circuit (1, 2, 17, 18, 20, 21) and the terminal-side circuit (10-12, 19) and the system is configured to perform a method comprising: reading a source-side supply temperature signal indicative of a supply temperature associated with the heat exchanger (16); reading a source-side return temperature signal indicative of a return temperature associated with the heat exchanger (16); reading a flow rate signal indicative of a flow rate of the fluid through the source-side circuit (1, 2, 17, 18, 20, 21); producing a source-side measure of supply temperature from the source-side supply temperature signal and a source-side measure of return temperature from the source-side return temperature signal and a flow rate measure from the flow rate signal; estimating a current amount of heat transfer by the heat exchanger (16) based on the source-side measures of supply and return temperatures and based on the flow rate measure; comparing the current amount to the value of maximum available power; if the current amount exceeds the value of maximum available power: producing a third flow control signal based on the value of maximum available power; and controlling the flow of the fluid through the source-side circuit (1, 2, 17, 18, 20, 21) in accordance with the third flow control signal.

In some embodiments, the method further comprises: determining a difference between the source-side measure of supply temperature and the source-side measure of return temperature; and estimating a current amount of heat transfer by the heat exchanger (16) based on the determined difference and based on the flow rate measure.

In some embodiments, the method further comprises estimating a current amount of heat transfer by the heat exchanger (16) based on a product of the determined difference and of the flow rate measure.

Some embodiments include a computer program comprising instructions which, when the program is executed by a computer, cause the computer to carry out the steps of any of the methods described herein.

As another example, some embodiments include a system comprising: a source-side controller (26) and a terminal-side controller (22), the terminal-side controller (22) being different from the source-side controller (26); the terminal-side controller (22) being configured to: read a terminal-side supply temperature signal indicative of a supply temperature from a temperature sensor (19) associated with a terminal unit (10-12) for heating and/or ventilation and/or air-conditioning; produce a terminal-side measure of supply temperature from the terminal-side supply temperature signal; estimate a percentage demand signal as a function of the terminal-side measure of supply temperature; transmit the percentage demand signal to the source-side controller (26); the source-side controller (26) being configured to: receive the percentage demand signal from the source-side controller (26); read a signal indicative of maximum available power; produce a value of maximum available power from the signal indicative of maximum available power; estimate an actual demand for power by rescaling the value of maximum available power by the percentage demand signal; compare the actual demand for power to the value of maximum available power; if the actual demand for power exceeds the value of maximum available power: produce a first flow control signal based on the value of maximum available power; and transmit the first flow control signal to a flow regulator (1, 2, 21) of a heating and/or ventilation and/or air-conditioning circuit (1, 2, 17, 18, 20, 21).

In some embodiments, the source-side controller (26) is configured to transmit the first flow control signal to a flow regulator (1, 2, 21) of a heating and/or ventilation and/or air-conditioning circuit (1, 2, 17, 18, 20, 21), the first flow control signal causing the flow regulator (1, 2, 21) to control the flow of the fluid through the heating and/or ventilation and/or air-conditioning circuit (1, 2, 17, 18, 20, 21) such that an amount of heat transferred via the heating and/or ventilation and/or air-conditioning circuit (1, 2, 17, 18, 20, 21) matches or substantially matches the value of maximum available power.

In some embodiments, the system comprises a system controller (15) having a system on a chip; the terminal-side controller (22) is arranged on the system on a chip of the system controller (15); and the source-side controller (26) is arranged on the system on a chip of the system controller (15).

In some embodiments, the system comprises a system controller (15) running a first isolated user space instance and a second isolated user space instance, the first isolated user space instance being different from the second isolated user space instance, the first isolated user space instance being in operative communication with the second isolated user space instance; the first isolated user space instance comprises the terminal-side controller (22); and the second isolated user space instance comprises the source-side controller (26).

BRIEF DESCRIPTION OF THE DRAWINGS

Various features are apparent to those skilled in the art from the following detailed description of the disclosed non-limiting embodiments. The drawings that accompany the detailed description can be briefly described as follows.

DETAILED DESCRIPTION

Figure 1:
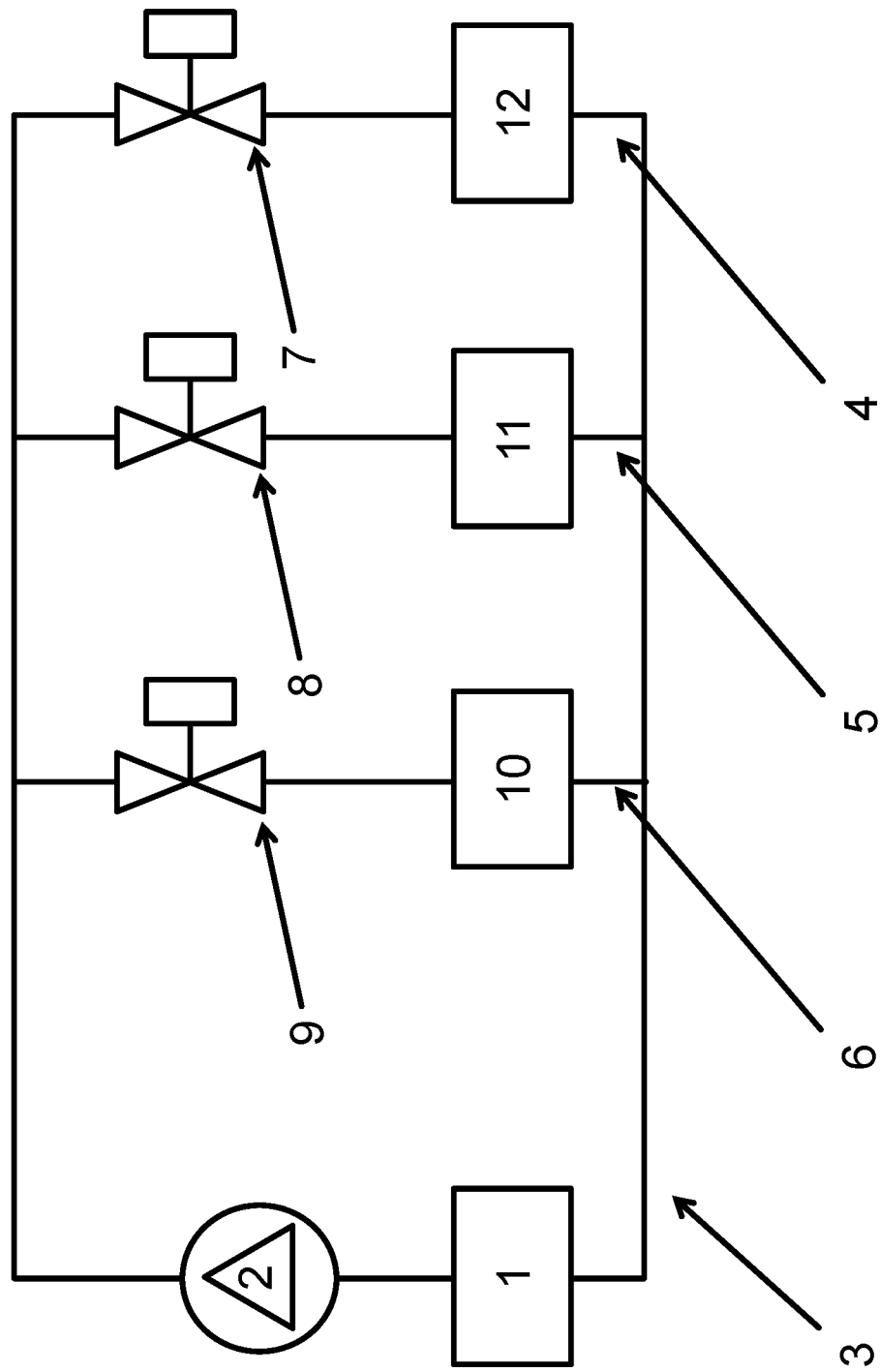
FIG. 1 is a schematic drawing of a prior art HVAC installation.

The teachings of the present disclosure include a control algorithm that can be implemented by a valve controller and/or by a control system. The control algorithm reads a signal indicative of supply temperature of a terminal unit such as a radiator and/or a chilled beam. The control algorithm then derives a demand for power such as a percentage demand for power from the supply temperature. The percentage demand for power is subsequently rescaled in accordance with a total amount of power available in the heating and/or ventilation and/or air-conditioning system. If the demand for power exceeds the total amount of power, a signal will be transmitted to a flow regulator such as a valve and/or a pump and/or a heat pump. The flow regulator will limit flow through a heating and/or ventilation and/or air-conditioning circuit in response to the signal.

The control algorithm mitigates the consequences of overload conditions in systems for heating and/or ventilation and/or air-conditioning. The control algorithm ensures that in the event of an overload condition the system readily returns to normal load.

To accurately determine a demand for power such as a percentage demand for power, a cooling curve and/or a heating curve can be employed. To that end, a controller can store a cooling curve and/or a heating curve in a memory such as a non-volatile memory and load the curve from the memory. The control algorithm can also factor a set point temperature into its estimate and/or determination of a demand for power.

In some embodiments, system operates as a heat meter. That is, the control algorithm obtains measures of supply and return temperatures as well as measures of flow rates associated with a first circuit of an installation. The control algorithm estimates and/or determines and/or calculates a current amount of power transferred via the circuit. If that current amount of power exceeds a value of maximum available power, this signal will be transmitted, and the system will readily return to normal operation. Heat meter functionality provides nuanced control in heating and/or ventilation and/or air-conditioning systems having flow rate sensors as well as supply and return temperature sensors.

A remote controller such as a cloud computer can implement the control algorithm. A valve such as a control valve and/or a valve associated with a terminal unit connects to the remote controller using a communication protocol and via a communication bus. The valve transmits signals indicative of temperatures and/or flow rates to the remote controller. The remote controller leverages such temperatures and/or flow rates and computes a maximum flow rate. The maximum flow rate is transmitted back to a valve and/or to a controller of a HVAC installation.

The valve and/or the controller of a HVAC installation then locally applies the maximum flow rate obtained from the remote controller. Solutions involving remote controllers such as cloud computers enable local valves and/or controllers of local HVAC installations having limited computational resources. In an advantageous embodiment, the local controller is or comprises an inexpensive, low-power system on a chip microcontroller having integrated wireless connectivity. In a special embodiment, the chip microcontroller has a memory not exceeding one mebibyte.

A HVAC installation as shown in FIG. 1 comprises a source 1 such as a heat pump, a gas-fired burner, an oil-fired burner, a cogeneration plant, a (polymer electrolyte membrane) fuel cell, a silicone oxide fuel cell etc. In some embodiments, the source 1 provides cooling.

A pump 2 circulates a suitable medium, such as a heating medium and/or a refrigerant, through conduits 3. The medium may, by way of non-limiting example, be water and/or a R-401A and/or R-404A and/or R-406A and/or R-407A and/or R-407C and/or R-408A and/or R-409A, R-410A and/or R-438A and/or R-500 and/or R-502 formulation. The pump 2 may be an electric pump. In some embodiments, the pump 2 is a variable speed pump. In some embodiments, a pulse-width modulation unit feeds the winding(s) of an actuator of the pump 2 in accordance with a duty cycle. In some embodiments, an inverter feeds the winding(s) of an actuator of the pump 2.

The conduits 3 of FIG. 1 are made up of a plurality of loops 4, 5, and 6. A valve 7, 8, and 9 is arranged in each loop 4, 5, and 6. The valves 7, 8, and 9 adjust flow through their respective loops 4, 5, and 6. At least one of the valves 7, 8, and 9 is a electromechanical valve. In some embodiments, all the valves 7, 8, and 9 are electromechanical valves. Each of the loops 4, 5, and 6 shown in FIG. 1 has a valve 7, 8, and 9. In some embodiments, there is at least one loop with no valve. In some embodiments, at least one loop 4, 5, or 6 comprises a plurality of valves.

In some embodiments, at least one of the valves 7, 8, or 9 of the installation preferably measures temperature and/or flow. In some embodiments, at least one of the valves 7, 8, or 9 of the installation includes a heat meter. In some embodiments, all the valves 7, 8, and 9 of the installation measure temperature and/or flow. In some embodiments, all the valves 7, 8, and 9 of the installation include heat meters.

Figure 2:
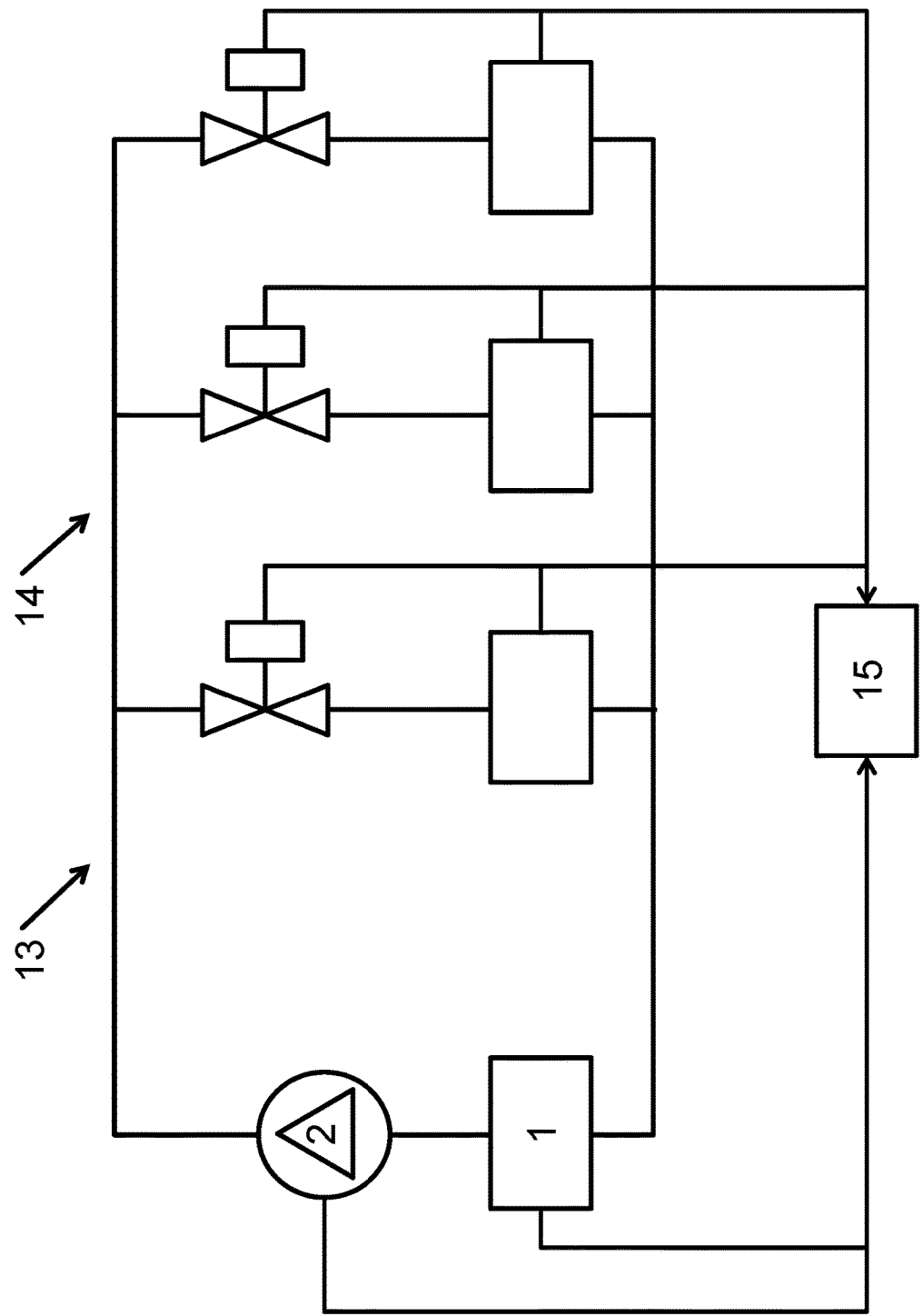
FIG. 2 is a schematic drawing of a HVAC installation having a controller incorporating teachings of the present disclosure.

A system controller 15 such as the controller depicted in FIG. 2 is typically part of a heating and/or ventilation and/or air-conditioning installation. In some embodiments, the system controller 15 comprises a microcontroller and/or a microprocessor. In an embodiment, the system controller 15 is a microcontroller and/or a microprocessor. FIG. 2 also shows connections between the system controller 15 and the valves 7, 8, or 9. FIG. 2 further shows connections between the system controller 15 and the terminal units 10-12. In some embodiments, at least one connection between the system controller 15 and one of the valves 7, 8, or 9 is bidirectional. In some embodiments, all the connections between the system controller 15 and the valves 7, 8, or 9 are bidirectional. Bidirectional connections afford flexibility.

Figure 3:
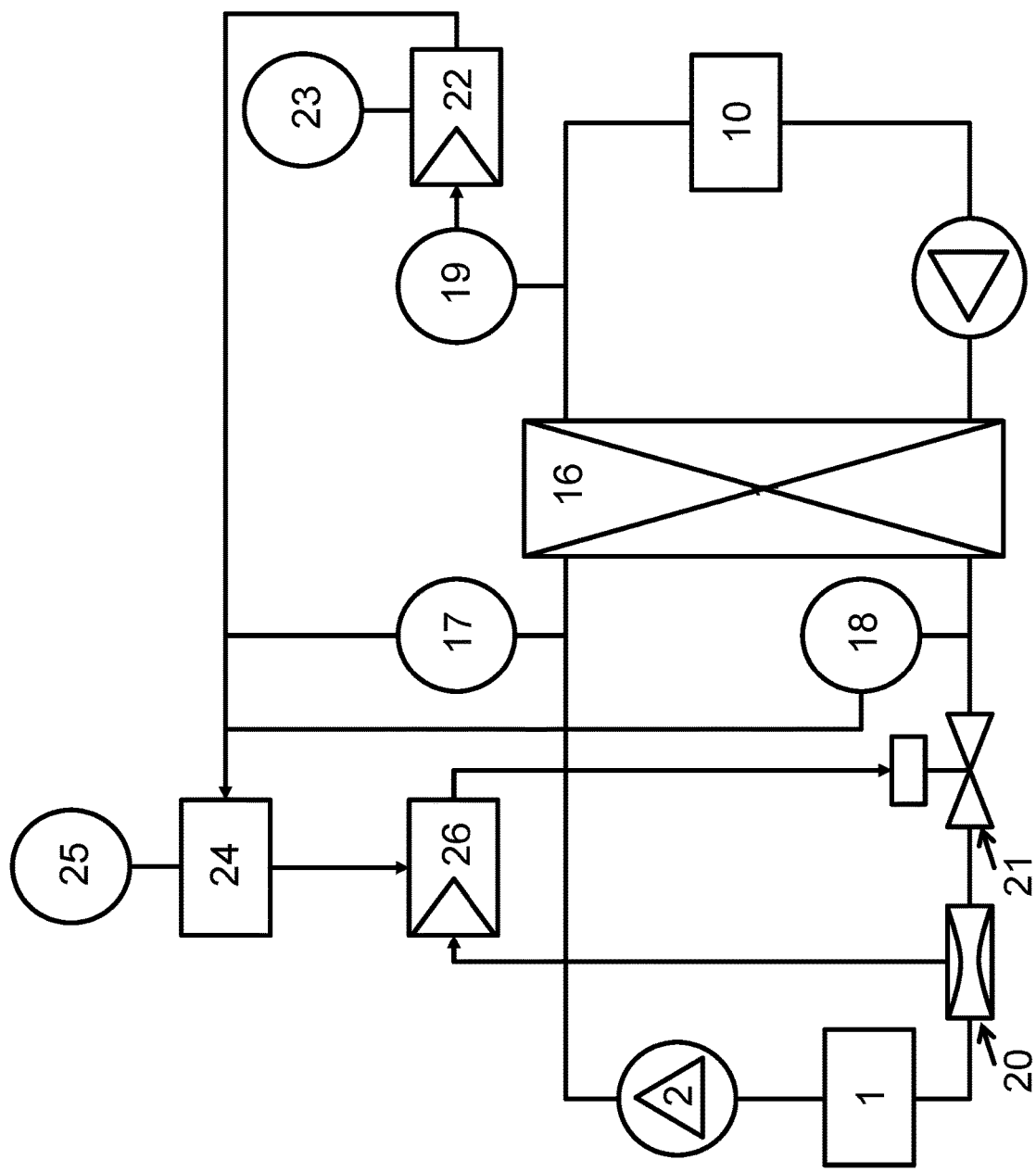
FIG. 3 schematically illustrates an embodiment incorporating teachings of the present disclosure.

The control algorithm of the present disclosure is illustrated in FIG. 3. FIG. 3 shows a HVAC installation having a heat exchanger 16. The heat exchanger 16 couples a first circuit 1, 2, 17, 18, 20, 21 comprising a source of heat and/or of cooling 1 and a second circuit 10, 19 comprising a terminal unit 10. In some embodiments, the first circuit 1, 2, 17, 18, 20, 21 is a primary circuit and the second circuit 10-12, 19 is a secondary circuit.

A sensor 17 records a signal indicative of a supply temperature of the first circuit. In some embodiments, the sensor 17 is or comprises a temperature sensor. In some embodiments, the first circuit comprises the sensor 17.

A sensor 18 records a signal indicative of a return temperature of the first circuit. In some embodiments, the sensor 18 is or comprises a temperature sensor. In some embodiments, the sensors 17 and 18 both comprise temperature sensors. In some embodiments, the sensors 17 and 18 are both temperature sensors. In some embodiments, the first circuit comprises the sensor 18. In some embodiments, the first circuit comprises the sensors 17 and 18.

In some embodiments, a sensor 19 records a signal indicative of a supply temperature of the second circuit. In some embodiments, the sensor 19 records a signal indicative of a temperature supplied to the terminal unit 10. In some embodiments, the sensor 19 is or comprises a temperature sensor. In some embodiments, the second circuit comprises the sensor 19.

A meter 20 records a signal indicative of a flow rate of a fluid through the first circuit. In some embodiments, the meter 20 is or comprises an ultrasonic flow meter. In some embodiments, the meter 20 is or comprises a vortex shedding flow meter. In some embodiments, the meter 20 employs constant temperature anemometry or constant power anemometry to record a signal indicative of a flow rate of a fluid through the first circuit. In some embodiments, the first circuit comprises the meter 20.

A valve 21 such as an electromechanical adjusts flow of the fluid through the first circuit. In some embodiments, the valve 21 is or comprises a ball-type valve. In some embodiments, the valve 21 is or comprises a butterfly valve. In some embodiments, the valve 21 is or comprises a globe valve. In some embodiments, the valve 21 comprises an actuator such as a solenoid actuator for moving a valve member of the valve 21 between a closed position and an open position. In some embodiments, the first circuit comprises the valve 21.

The sensor 19 of the second circuit transmits a signal to a terminal-side controller 22. The terminal-side controller 22 can be a secondary-side controller. In some embodiments, the terminal-side controller 22 is part of a system controller 15. In some embodiments, the terminal-side controller 22 and the system controller 15 are arranged on the same system on a chip. The arrangement of the terminal-side controller 22 and of the system controller 15 on the system on a chip affords a compact solution.

The terminal-side controller 22 reads the signal originating from the sensor 19 and produces a measure of supply temperature. In some embodiments, the terminal-side controller 22 employs analog-to-digital conversion to convert the signal originating from the sensor 19 into a measure of supply temperature. In some embodiments, the terminal-side controller 22 employs delta-sigma modulation to convert the signal originating from the sensor 19 into a measure of supply temperature. The terminal-side controller 22 further reads a signal 23 indicative of a temperature set point. The signal 23 indicative of a temperature set point can be a digital signal read via a digital input of the terminal-side controller 22. The signal 23 indicative of a temperature set point can also be an analog signal read via an analog input of the terminal-side controller 22. Where the signal 23 is an analog signal, the terminal-side controller 22 can employ analog-to-digital conversion to produce a measure of set point temperature. The terminal-side controller 22 can also employ delta-sigma modulation to produce a measure of set point temperature.

The controller 22 estimates a percentage demand signal based on the signal from the sensor 19 and/or on the signal 23 indicative of a temperature set point. In some embodiments, the controller 22 determines a percentage demand signal based on the signal from the sensor 19 and/or on the signal 23 indicative of a temperature set point. In some embodiments, the controller 22 calculates a percentage demand signal based on the signal from the sensor 19 and/or on the signal 23 indicative of a temperature set point. In some embodiments, the terminal-side controller 22 employs a heating curve to estimate and/or to determine and/or to calculate the percentage demand signal. In some embodiments, the terminal-side controller 22 employs a cooling curve to estimate and/or to determine and/or to calculate the percentage demand signal. In some embodiments, the percentage demand signal indicates a percentage of a total demand for power.

In some embodiments, the controller 22 estimates a percentage demand signal based on the measure of supply temperature and/or the signal 23 indicative of a temperature set point. In some embodiments, the terminal-side controller 22 determines a percentage demand signal based on the measure of supply temperature and/or the signal 23 indicative of a temperature set point. In some embodiments, the terminal-side controller 22 calculates a percentage demand signal based on the measure of supply temperature and/or the signal 23 indicative of a temperature set point. In some embodiments, the terminal-side controller 22 employs a heating curve to estimate and/or to determine and/or to calculate the percentage demand signal. In some embodiments, the terminal-side controller 22 employs a cooling curve to estimate and/or to determine and/or to calculate the percentage demand signal. In some embodiments, the percentage demand signal indicates a percentage of a total demand for power.

In some embodiments, the controller 22 estimates a percentage demand signal based on the signal from the sensor 19 and/or on the measure of set point temperature. In some embodiments, the terminal-side controller 22 determines a percentage demand signal based on the signal from the sensor 19 and/or on the measure of set point temperature. In some embodiments, the terminal-side controller 22 calculates a percentage demand signal based on the signal from the sensor 19 and/or on the measure of set point temperature. In some embodiments, the terminal-side controller 22 employs a heating curve to estimate and/or to determine and/or to calculate the percentage demand signal. In some embodiments, the terminal-side controller 22 employs a cooling curve to estimate and/or to determine and/or to calculate the percentage demand signal. In some embodiments, the percentage demand signal indicates a percentage of a total demand for power.

In some embodiments, the controller 22 can also estimate a percentage demand signal based on the measure of supply temperature and/or on the measure of set point temperature. In some embodiments, the terminal-side controller 22 determines a percentage demand signal based on the measure of supply temperature and/or on the measure of set point temperature. In some embodiments, the terminal-side controller 22 calculates a percentage demand signal based on the measure of supply temperature and/or on the measure of set point temperature. It is envisaged that the terminal-side controller 22 employs a heating curve to estimate and/or to determine and/or to calculate the percentage demand signal. In some embodiments, the terminal-side controller 22 employs a cooling curve to estimate and/or to determine and/or to calculate the percentage demand signal. In some embodiments, the percentage demand signal indicates a percentage of a total demand for power.

The terminal-side controller 22 transmits the percentage demand signal to a converter 24. In some embodiments, the converter 24 is or comprises a scaling unit. In some embodiments, the converter 24 is part of a system controller 15. In some embodiments, the converter 24 and the system controller 15 are arranged on the same system on a chip. The arrangement of the converter 24 and of the system controller 15 on the system on a chip affords a compact solution.

The converter 24 reads a signal 25 indicative of maximum available power. The signal 25 indicative of a maximum available power can be a digital signal read via a digital input of the converter 24. The signal 25 indicative of a maximum available power can also be an analog signal read via an analog input of the converter 24. Where the signal 25 is an analog signal, the converter 24 can employ analog-to-digital conversion to produce a measure of maximum available power. The converter 24 can also employ delta-sigma modulation to produce a measure of maximum available power.

The converter 24 estimates an actual demand for power based on the signal 25 indicative of maximum available power and the percentage demand signal. In so doing, the converter 24 can multiply the signal 25 indicative of maximum available power and the percentage demand signal. In some embodiments, the converter 24 determines an actual demand for power based on the signal 25 indicative of maximum available power and the percentage demand signal. In so doing, the converter 24 can multiply the signal 25 indicative of maximum available power and the percentage demand signal. In some embodiments, the converter 24 calculates an actual demand for power based on the signal 25 indicative of maximum available power and the percentage demand signal. In so doing, the converter 24 can multiply the signal 25 indicative of maximum available power and the percentage demand signal.

The converter 24 can also estimate an actual demand for power based on the measure of maximum available power and the percentage demand signal. In so doing, the converter 24 can multiply the measure of maximum available power and the percentage demand signal. In some embodiments, the converter 24 determines an actual demand for power based on the measure of maximum available power and the percentage demand signal. In so doing, the converter 24 can multiply the measure of maximum available power and the percentage demand signal. In some embodiments, the converter 24 calculates an actual demand for power based on the measure of maximum available power and the percentage demand signal. In so doing, the converter 24 can multiply the measure of maximum available power and the percentage demand signal.

The converter 24 transmits the actual demand for power to a source-side controller 26. The source-side controller 26 can be a primary-side controller. In some embodiments, the source-side controller 26 is part of a system controller 15. In some embodiments, the source-side controller 26 and the system controller 15 are arranged on the same system on a chip. The arrangement of the source-side controller 26 and of the system controller 15 on the system on a chip affords a compact solution.

In some embodiments, the converter 24 transmits a set point value of a flow rate to the source-side controller 26. In so doing, the converter 24 can read signals from the sensors 17, 18 and determine a temperature drop. The converter 24 then uses the temperature drop to convert an actual demand for power into a set point value of a flow rate.

In some embodiments, the flow rate $\dot{m}$ is determined from the actual demand for power $\dot{Q}$ in and from the temperature drop $\Delta T$ accordance with the relationship $$\dot{m} = \frac{\dot{Q}}{c \cdot \Delta T},$$

wherein c is a constant.

The source-side controller 26 reads the signal originating from the meter and/or flow sensor 20 and produces a valve position. The signal originating from the meter and/or flow sensor 20 can be a digital signal read via a digital input of the source-side controller 26. The signal originating from the meter and/or flow sensor 20 can also be an analog signal read via an analog input of the source-side controller 26. Where the signal originating from the meter and/or flow sensor 20 is an analog signal, the source-side controller 26 can employ analog-to-digital conversion to produce a valve position. The source-side controller 26 can also employ delta-sigma modulation to produce a measure of a valve position.

The source-side controller 26 estimates a valve position based on the signal originating from the meter 20 and based on the actual demand for power. In some embodiments, the source-side controller 26 determines a valve position based on the signal originating from the meter 20 and based on the actual demand for power. The source-side controller 26 ideally calculates a valve position based on the signal originating from the meter 20 and based on the actual demand for power.

The source-side controller 26 transmits the estimated and/or determined and/or calculated valve position to the valve 21. The valve 21 then sets a position of its valve member in response to the estimated and/or determined and/or calculated valve position.

The source-side controller 26 also records a signal indicative of supply temperature from the sensor 17 and a signal indicative of return temperature from the sensor 18. The source-side controller 26 can estimate a current power consumption based on these signals and based on the signal originating from the meter 20. The source-side controller 26 can advantageously determine a current power consumption based on these signals and based on the signal originating from the meter 20. In some embodiments, the source-side controller 26 can calculate a current power consumption based on these signals and based on the signal originating from the meter 20.

The signal originating from the sensor 17 can be a digital signal read via a digital input of the source-side controller 26. The signal originating from the sensor 17 can also be an analog signal read via an analog input of the source-side controller 26. Where the signal originating from the sensor 17 is an analog signal, the source-side controller 26 can employ analog-to-digital conversion to produce a supply temperature of the first circuit. The source-side controller 26 can also employ delta-sigma modulation to produce a supply temperature of the first circuit.

The signal originating from the sensor 18 can be a digital signal read via a digital input of the source-side controller 26. The signal originating from the sensor 18 can also be an analog signal read via an analog input of the source-side controller 26. Where the signal originating from the sensor 18 is an analog signal, the source-side controller 26 can employ analog-to-digital conversion to produce a return temperature of the first circuit. The source-side controller 26 can also employ delta-sigma modulation to produce a return temperature of the first circuit.

The controller 26 can also estimate an amount of heat transfer based on the supply and return temperatures of the first circuit and on the signal from the meter 20. The source-side controller 26 can determine an amount of heat transfer based on such supply and return temperatures and on the signal from the meter 20. In some embodiments, the source-side controller 26 can calculate an amount of heat transfer based on such supply and return temperatures and on the signal from the meter 20.

The source-side controller 26 can still estimate a current amount of heat transfer based on the supply and return temperatures of the first circuit and based on the flow rate. The source-side controller 26 can determine a current amount of heat transfer based on such supply and return temperatures and based on the flow rate. In some embodiments, the source-side controller 26 can calculate a current amount of heat transfer based on such supply and return temperatures and based on the flow rate.

If the current amount of heat transfer exceeds a threshold, the source-side controller 26 will limit the estimated and/or determined and/or calculated valve position. More specifically, the source-side controller 26 can limit this valve position as a function of the signal 25 indicative of maximum available power. In some embodiments, the source-side controller 26 can limit the estimated and/or determined and/or calculated valve position as a function of the measure of maximum available power.

Figure 4:
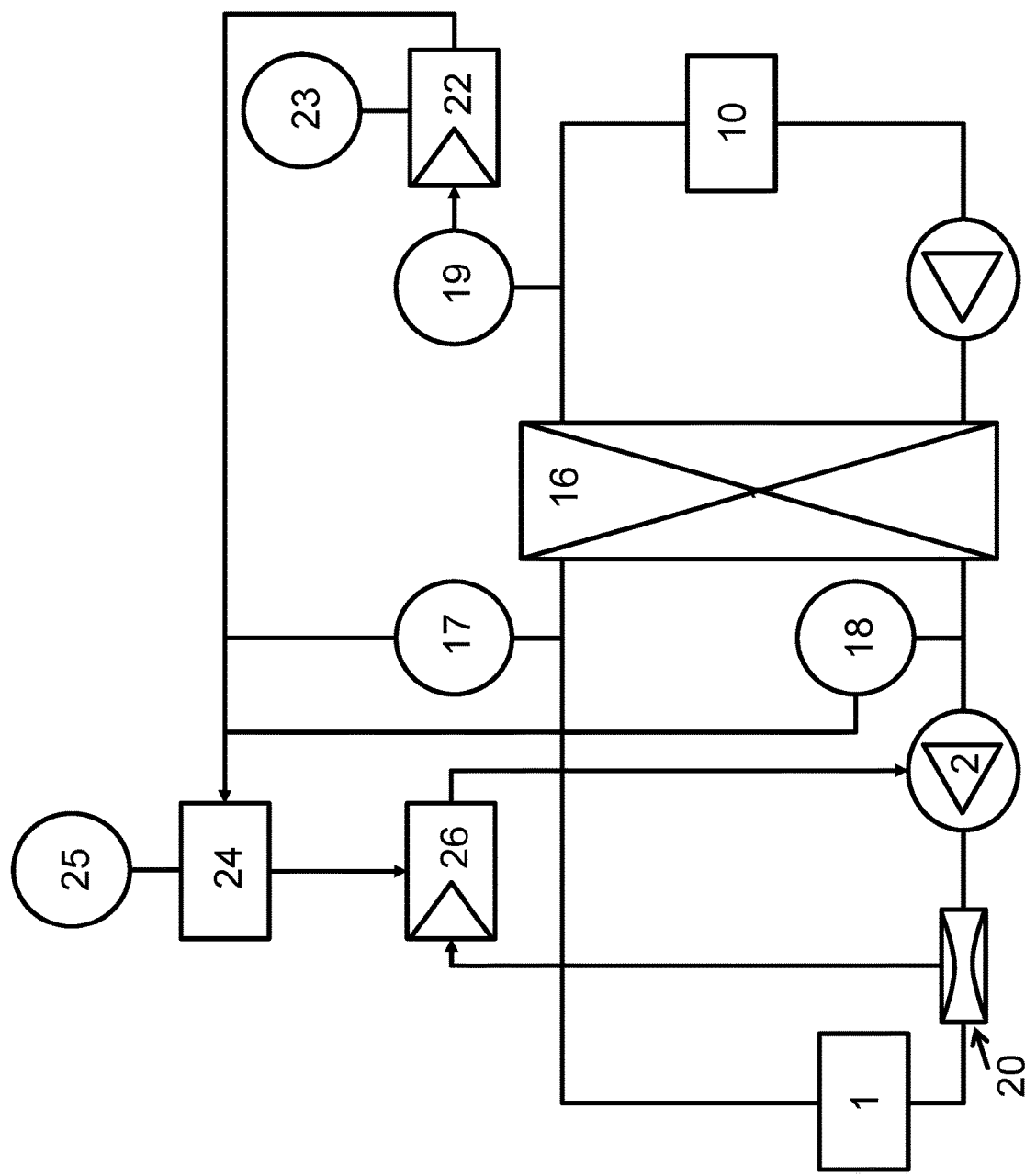
FIG. 4 schematically illustrates another embodiment incorporating teachings of the present disclosure.

The source-side controller 26 transmits the limited valve position to the valve 21. The pump 2 controls flow of a fluid through the first circuit in response to the speed signal. Now turning to FIG. 4, the source-side controller 26 no longer transmits its output to a valve 21. Instead, the circuit comprises a pump 2 such as a variable speed pump. The source-side controller 26 transmits an output signal such as a speed signal to the pump 2.

That is, the source-side controller 26 estimates a speed signal based on the signal originating from the meter 20 and based on the actual demand for power. In some embodiments, the source-side controller 26 determines a speed signal based on the signal originating from the meter 20 and based on the actual demand for power. In some embodiments, the source-side controller 26 calculates a speed signal based on the signal originating from the meter 20 and based on the actual demand for power.

The source-side controller 26 then transmits the estimated and/or determined and/or calculated speed signal to the pump 2. The pump 2 controls flow of a fluid through the first circuit comprising the source 1 in response to the limited speed signal. If the current amount of heat transfer exceeds a threshold, the source-side controller 26 will limit the estimated and/or determined and/or calculated speed signal. More specifically, the source-side controller 26 can limit this speed signal as a function of the signal 25 indicative of maximum available power. Also, the source-side controller 26 can limit the estimated and/or determined and/or calculated speed signal as a function of the measure of maximum available power.

The source-side controller 26 then transmits the limited speed signal to the pump 2. The pump 2 controls flow of a fluid through the first circuit in response to the limited speed signal. In some embodiments, the source-side controller 26 comprises a digital-to-analog converter. The source-side controller 26 thus connects to the pump 2 via the digital-to-analog converter. The digital-to-analog converter produces an analog signal such as a current signal and/or a voltage signal based on a digital representation of the speed signal. The analog signal produced by the digital-to-analog converter can optionally be amplified. The analog signal is eventually transmitted to the pump 2.

In some embodiments, the source-side controller 26 and the digital-to-analog converter are arranged on the same system on a chip. The arrangement of the source-side controller 26 and of the digital-to-analog converter on the system on a chip affords a compact solution.

In some embodiments, the source-side controller 26 comprises an inverter. Accordingly, the source-side controller 26 connects to the pump 2 via the inverter. The inverter produces an inverter signal based on a digital representation of the speed signal. The inverter signal can optionally be amplified. The inverter signal is eventually transmitted to the pump 2.

Figure 5:
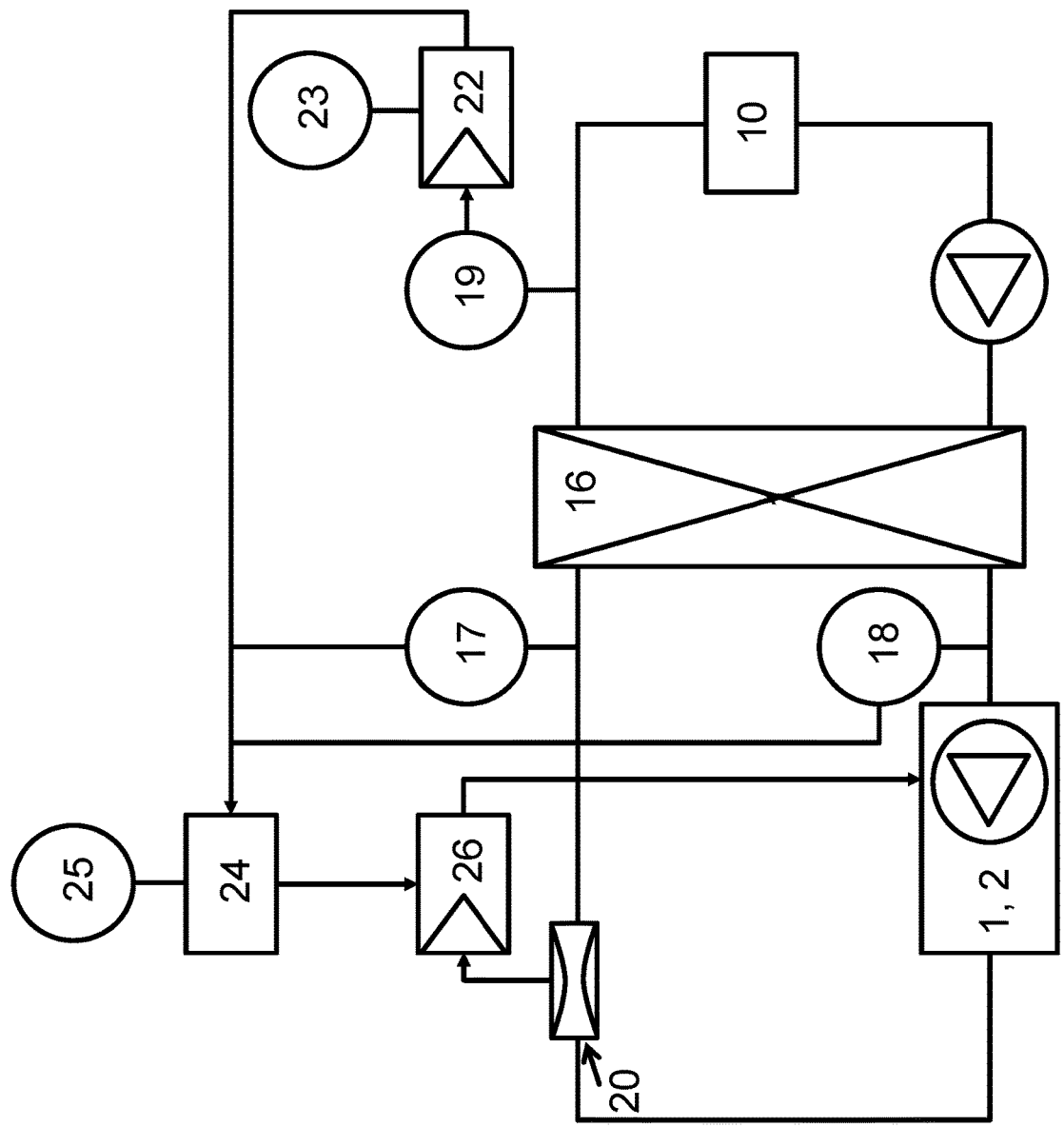
FIG. 5 schematically illustrates yet another embodiment incorporating teachings of the present disclosure.

FIG. 5 shows an embodiment wherein the pump and the source form a heat pump 1, 2. That is, the source-side controller 26 estimates a heat pump signal based on the signal originating from the meter 20 and based on the actual demand for power. In some embodiments, the source-side controller 26 determines a heat pump signal based on the signal originating from the meter 20 and based on the actual demand for power. In some embodiments, the source-side controller 26 calculates a heat pump signal based on the signal originating from the meter 20 and based on the actual demand for power.

The source-side controller 26 then transmits the estimated and/or determined and/or calculated heat pump signal to the heat pump 1, 2. The heat pump 1, 2 controls its output in response to the estimated and/or determined and/or calculated heat pump signal. If the current power consumption exceeds a threshold, the source-side controller 26 will limit the estimated and/or determined and/or calculated heat pump signal. More specifically, the source-side controller 26 can limit this heat pump signal as a function of the signal 25 indicative of maximum available power. Also, the source-side controller 26 can limit the estimated and/or determined and/or calculated heat pump signal as a function of the measure of maximum available power.

The source-side controller 26 then transmits the limited heat pump signal to the heat pump 1, 2. The heat pump 1, 2 controls flow of a fluid through the first circuit in response to the limited heat pump signal.

In some embodiments, the source-side controller 26 comprises a digital-to-analog converter. The source-side controller 26 thus connects to the heat pump 1, 2 via the digital-to-analog converter. The digital-to-analog converter produces an analog signal such as a current signal and/or a voltage signal based on a digital representation of the heat pump signal. The analog signal produced by the digital-to-analog converter can optionally be amplified. The analog signal is eventually transmitted to the heat pump 1, 2.

In some embodiments, the source-side controller 26 and the digital-to-analog converter are arranged on the same system on a chip. The arrangement of the source-side controller 26 and of the digital-to-analog converter on the system on a chip affords a compact solution.

In some embodiments, the source-side controller 26 comprises an inverter. Accordingly, the source-side controller 26 connects to the heat pump 1, 2 via the inverter. The inverter produces an inverter signal based on a digital representation of the heat pump signal. The inverter signal can optionally be amplified. The inverter signal is eventually transmitted to the heat pump 1, 2.

Figure 6:
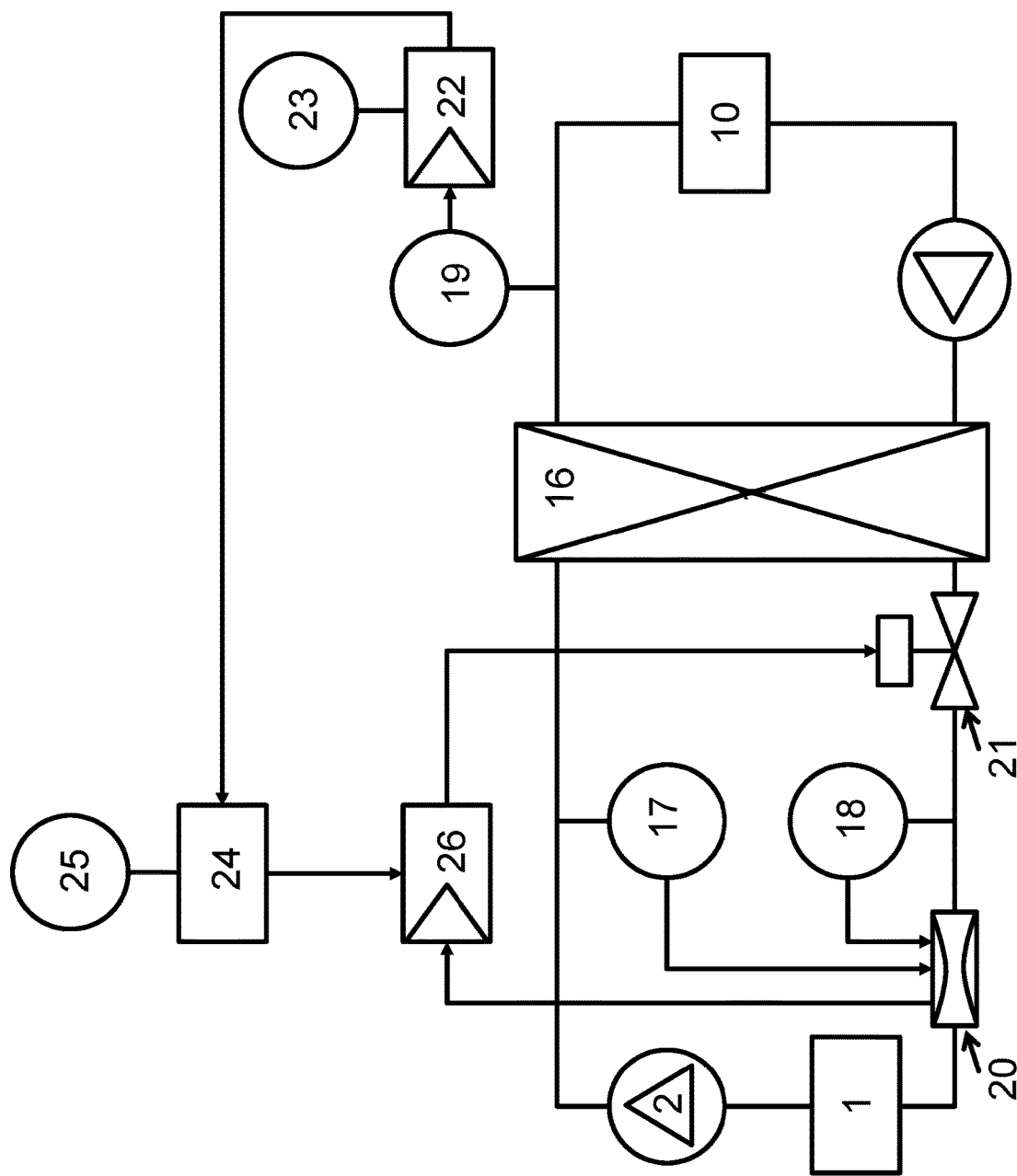
FIG. 6 schematically illustrates still another embodiment incorporating teachings of the present disclosure.

FIG. 6 shows an embodiment wherein a heat meter 17, 18, 20 collects and processes information about flow, supply temperature, and return temperature. The source-side controller 26 processes data and/or signals provided by the heat meter 17, 18, 20. More specifically, the source-side controller 26 processes data and/or signals indicative of power transmitted from the heat meter 17, 18, 20 to the source-side controller 26.

Figure 7:
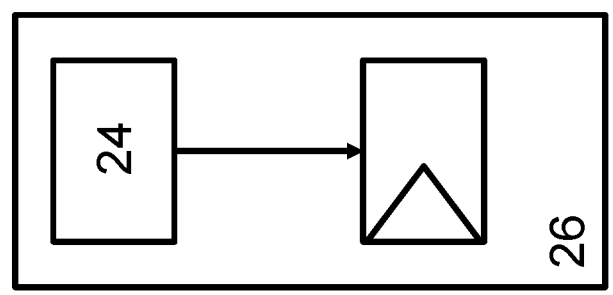
FIG. 7 schematically illustrates a source-side controller comprising a converter incorporating teachings of the present disclosure.

Now turning to FIG. 7, a source-side controller 26 is shown that comprises a converter 24. The source-side controller 26 can also comprise a converter 24 in the form of a scaling unit.

Figure 8:
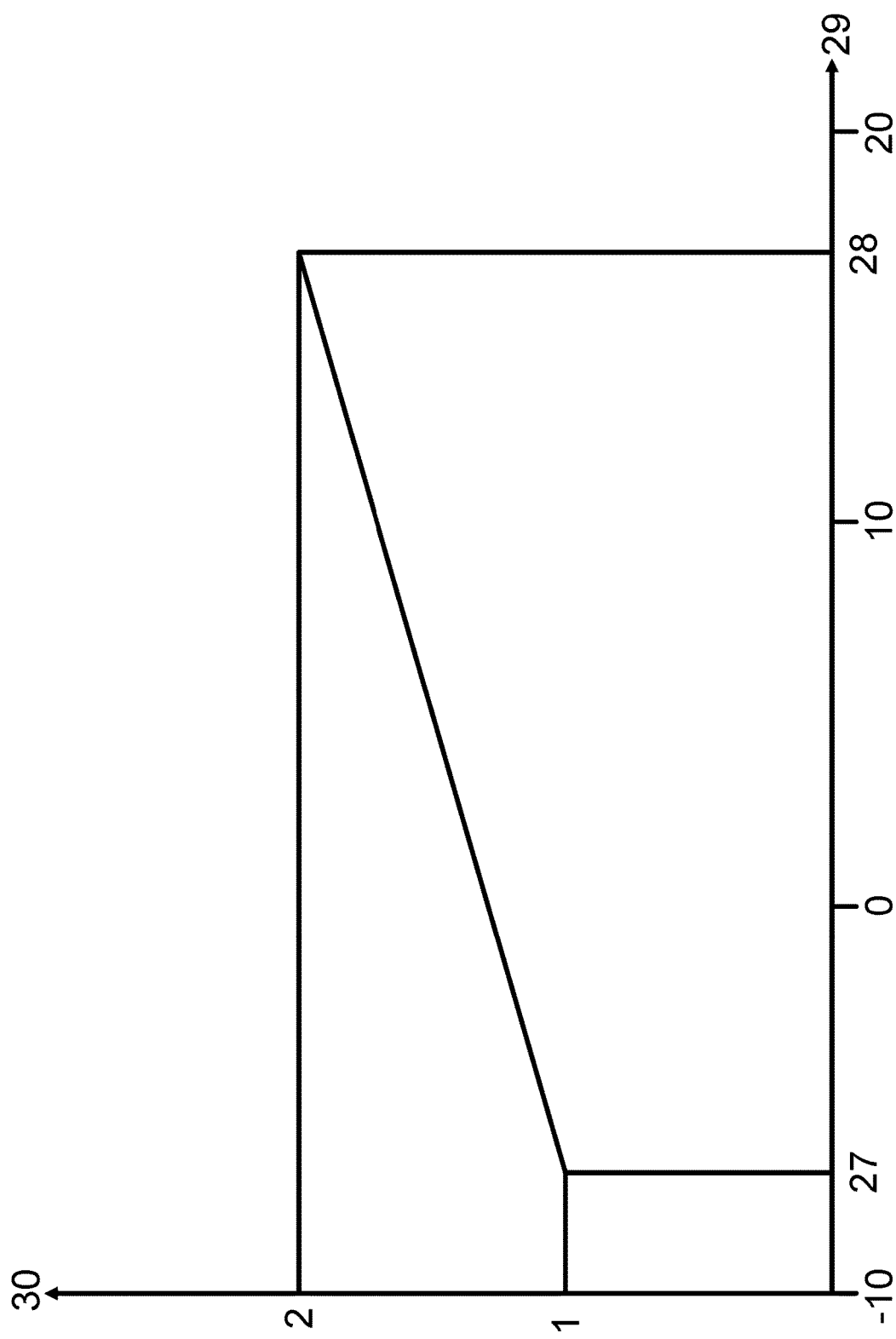
FIG. 8 is a plot of a control signal versus outside temperature.

FIG. 8 shows a plot of a relative power increase versus an outside air temperature. The outside air temperature is indicated in units of degrees centigrade. The relative power increase equals one at a design outside temperature. The design outside temperature is an outside temperature low signal. The relative power increase equals two at an outside temperature high signal. The outside temperature high signal corresponds to an outside air temperature that is higher than the outside air temperature corresponding to the outside temperature low signal.

The plot shown in FIG. 8 may be used to control flow through a terminal unit 10-12 as a function of outside temperature. To that end, a signal indicative of outside temperature and/or of outside air temperature is recorded. A measure of outside temperature and/or of outside air temperature is produced from the signal. The plot shown in FIG. 8 is then used to map the measure of outside temperature and/or the measure of outside air temperature to a relative power increase. A terminal unit 10-12 can then be controlled in accordance with the relative power increase.

That is, an actual demand for power may be estimated by rescaling a value of maximum available power by the percentage demand signal and as a function of outside temperature. More specifically, the percentage demand signal is estimated as a function of the terminal-side measure of supply temperature and as a function of outside temperature. The actual demand for power is then estimated by rescaling a value of maximum available power by the percentage demand signal, where the percentage demand signal also depends on outside temperature. In some embodiments, the percentage demand signal increases with increasing outside temperature. In some embodiments, the percentage demand signal decreases with increasing outside temperature.

In some embodiments, the value of maximum available power is estimated as a function of outside temperature. In other words, an actual demand for power is estimated by rescaling a value of maximum available power by the percentage demand signal, where the value of maximum available power depends on outside temperature. In some embodiments, the value of maximum available power increases with increasing outside temperature. In some embodiments, the value of maximum available power decreases with increasing outside temperature.

Figure 9:
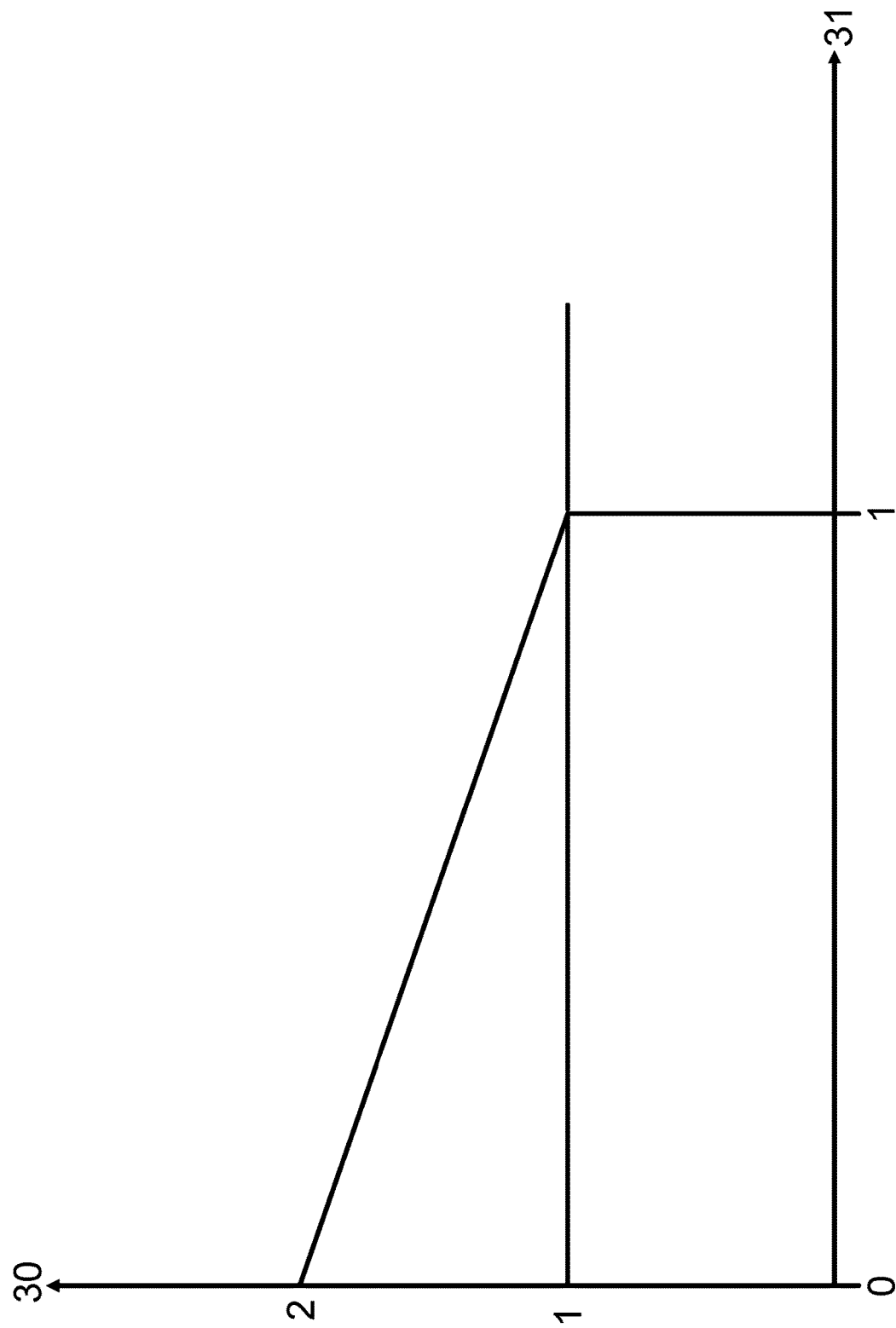
FIG. 9 is a plot of a control signal versus current availability of power.

FIG. 9 shows a plot of a relative power increase $P_{rel,inc}$, 30 versus momentarily provided power 31. Momentarily provided power 31 is plotted in units of rated power: $P_{mom}/P_{rat}$. The relative power increase $P_{rel,inc}$ equals two as the momentarily available power $P_{mom}$ approaches zero. The relative power increase $P_{rel,inc}$ equals one when momentarily provided power $P_{mom}$ matches rated power $P_{rat}$. If momentarily provided power $P_{mom}$ exceeds rated power $P_{rat}$, the relative power increase $P_{rel,inc}$ will remain one:

$$P_{rel,inc} = \begin{cases} 2 - \dfrac{P_{mom}}{P_{rat}} & \forall\, 0 \le P_{mom} < P_{rat} \\ 1 & \forall\, P_{mom} \ge P_{rat} \end{cases}$$

As momentarily available power $P_{mom}$ approaches zero, the relative power increase $P_{rel,inc}$ can also be different from two. In an embodiment, the relative power increase $P_{rel,inc}$ becomes 1.5 as momentarily available power $P_{mom}$ approaches zero:

$$P_{rel,inc} = \begin{cases} 1.5 - \dfrac{P_{mom}}{P_{rat}} & \forall\, 0 \le P_{mom} < P_{rat} \\ 1 & \forall\, P_{mom} \ge P_{rat} \end{cases}$$

In some embodiments, the relative power increase $P_{rel,inc}$ becomes 2.66 as momentarily available power $P_{mom}$ approaches zero:

$$P_{rel,inc} = \begin{cases} 2.66 - \dfrac{P_{mom}}{P_{rat}} & \forall\, 0 \le P_{mom} < P_{rat} \\ 1 & \forall\, P_{mom} \ge P_{rat} \end{cases}$$

In some embodiments, a value of relative power increase $P_{rel,inc}$ when momentarily available power $P_{mom}$ approaches zero can be set as required. The relationship describing the relative power increase $P_{rel,inc}$ can generally be expressed as $$P_{rel,inc} = \begin{cases} c_1 - (c_2 - 1)\dfrac{P_{mom}}{P_{rat}} & \forall\, 0 \le P_{mom} < P_{rat} \\ 1 & \forall\, P_{mom} \ge P_{rat} \end{cases}$$

with constants $c_1 > 0$ and $c_2 \ge 1$.

That is, an actual demand for power is estimated by rescaling a value of maximum available power by the percentage demand signal and as a function of momentarily provided power. More specifically, the percentage demand signal is estimated as a function of the terminal-side measure of supply temperature and as a function of momentarily provided power. The actual demand for power is then estimated by rescaling a value of maximum available power by the percentage demand signal, where the percentage demand signal also depends on momentarily provided power.

In some embodiments, the value of maximum available power is estimated as a function of momentarily provided power. In other words, an actual demand for power is estimated by rescaling a value of maximum available power by the percentage demand signal, where the value of maximum available power depends on momentarily provided power.

Any steps of a method described in the present disclosure can be embodied in hardware and/or in a software module executed by a processor and/or in a software module executed by a processor inside a container using operating system level virtualisation and/or in a cloud computing arrangement, or in a combination thereof. The software may include a firmware and/or a hardware driver run by the operating system and/or or an application program. Thus, the disclosure also relates to a computer program product for performing the operations presented herein. If implemented in software, the functions described may be stored as one or more instructions on a computer-readable medium. Some examples of storage media that can be used include random access memory (RAM) and/or read only memory (ROM) and/or flash memory and/or EPROM memory and/or EEPROM memory and/or registers and/or a hard disk and/or a removable disk and/or other optical disks and/or or any available media that can be accessed by a computer or any other IT equipment and appliance.

In some embodiments, a method of controlling heat exchange via a terminal unit (10-12) of a terminal-side circuit (10-12, 19) of a system for heating and/or ventilation and/or air-conditioning, the system for heating and/or ventilation and/or air-conditioning also comprising a source-side circuit (1, 2, 17, 18, 20, 21) coupled to the terminal-side circuit (10-12, 19), includes:

reading a terminal-side supply temperature signal indicative of a supply temperature associated with the terminal unit (10-12);

producing a terminal-side measure of supply temperature from the terminal-side supply temperature signal;

estimating a percentage demand signal as a function of the terminal-side measure of supply temperature;

estimating an actual demand for power by rescaling a value of maximum available power by the percentage demand signal;

comparing the actual demand for power to the value of maximum available power;

if the actual demand for power exceeds the value of maximum available power:

producing a first flow control signal based on the value of maximum available power; and controlling a flow of a fluid through the source-side circuit (1, 2, 17, 18, 20, 21) in accordance with the first flow control signal.

In some embodiments, the method of controlling heat exchange via a terminal unit (10-12) of a terminal-side circuit (10-12, 19) of a system for heating and/or ventilation and/or air-conditioning is a method of controlling heat exchange of a terminal unit (10-12) of a terminal-side circuit (10-12, 19) of a system for heating and/or ventilation and/or air-conditioning. In some embodiments,the method of controlling heat exchange via a terminal unit (10-12) of a terminal-side circuit (10-12, 19) of a system for heating and/or ventilation and/or air-conditioning is a method of controlling heat exchange by a terminal unit (10-12) of a terminal-side circuit (10-12, 19) of a system for heating and/or ventilation and/or air-conditioning. In some embodiments, the method of controlling heat exchange via a terminal unit (10-12) of a terminal-side circuit (10-12, 19) of a system for heating and/or ventilation and/or air-conditioning is a method of controlling a system for heating and/or ventilation and/or air-conditioning.

In some embodiments, the source-side circuit (1, 2, 17, 18, 20, 21) is or comprises a first circuit (1, 2, 17, 18, 20, 21). In some embodiments, the terminal-side circuit (10-12, 19) is or comprises a second circuit (10-12, 19). The system for heating and/or ventilation and/or air-conditioning may comprise a heat exchanger (16), the heat exchanger (16) coupling the source-side circuit (1, 2, 17, 18, 20, 21) and the terminal-side circuit (10-12, 19).

In some embodiments, the method comprises reading a terminal-side supply temperature signal indicative of a supply temperature of the terminal unit (10-12).

In some embodiments, the method comprises reading a terminal-side supply temperature signal indicative of a supply temperature associated with the terminal-side circuit (10-12, 19).

In some embodiments, the method comprises reading a terminal-side supply temperature signal indicative of a supply temperature of the terminal-side circuit (10-12, 19).

In some embodiments, the terminal-side circuit (10-12, 19) comprises a supply temperature sensor (19), the method comprising reading a terminal-side supply temperature signal indicative of a supply temperature of the terminal unit (10-12) from the supply temperature sensor (19).

In some embodiments, the terminal-side circuit (10-12, 19) comprises a supply temperature sensor (19) associated with the terminal unit (10-12), the method comprising reading a terminal-side supply temperature signal indicative of a supply temperature associated with the terminal unit (10-12) from the supply temperature sensor (19).

In some embodiments, the terminal unit (10-12) has a supply side. The supply temperature sensor (19) is arranged on the supply side of the terminal unit (10-12). The terminal unit (10-12) also has a return side, the return side of the terminal unit (10-12) being different from the supply side of the terminal unit (10-12).

In some embodiments, the method comprises using analog-to-digital conversion to produce a terminal-side measure of supply temperature from the terminal-side supply temperature signal.

In some embodiments, the method comprises using delta-sigma modulation to produce a terminal-side measure of supply temperature from the terminal-side supply temperature signal.

In some embodiments, the method comprises: reading a signal indicative of maximum available power of the system for heating and/or ventilation and/or air-conditioning; and producing a value of maximum available power from the signal indicative of maximum available power.

In some embodiments, the method comprises: reading a signal indicative of maximum available power of the system for heating and/or ventilation and/or air-conditioning; and using analog-to-digital conversion to produce a value of maximum available power from the signal indicative of maximum available power.

In some embodiments, the method comprises: reading a signal indicative of maximum available power of the system for heating and/or ventilation and/or air-conditioning; and using delta-sigma modulation to produce a value of maximum available power from the signal indicative of maximum available power.

In some embodiments, the method comprises estimating the actual demand for power by multiplying the value of maximum available power and the percentage demand signal.

In some embodiments, the method comprises determining the actual demand for power by multiplying the value of maximum available power and the percentage demand signal.

In some embodiments, the method comprises calculating the actual demand for power by multiplying the value of maximum available power and the percentage demand signal.

In some embodiments, the method comprises determining the actual demand for power by rescaling the value of maximum available power by the percentage demand signal.

In some embodiments, the method comprises calculating the actual demand for power by rescaling the value of maximum available power by the percentage demand signal.

In some embodiments, the system for heating and/or ventilation and/or air-conditioning comprises a converter (24), the method comprises using the converter (24) to estimate the actual demand for power by multiplying the value of maximum available power and the percentage demand signal.

In some embodiments, the system for heating and/or ventilation and/or air-conditioning comprises a converter (24), the method comprising using the converter (24) to determine the actual demand for power by multiplying the value of maximum available power and the percentage demand signal.

In some embodiments, the system for heating and/or ventilation and/or air-conditioning comprises a converter (24), the method comprising using the converter (24) to calculate the actual demand for power by multiplying the value of maximum available power and the percentage demand signal.

In some embodiments, the system for heating and/or ventilation and/or air-conditioning comprises a converter (24), the method comprising using the converter (24) to estimate the actual demand for power by rescaling the value of maximum available power by the percentage demand signal.

In some embodiments, the system for heating and/or ventilation and/or air-conditioning comprises a converter (24), the method comprising using the converter (24) to determine the actual demand for power by rescaling the value of maximum available power by the percentage demand signal.

In some embodiments, the system for heating and/or ventilation and/or air-conditioning comprises a converter (24), the method comprising the using the converter (24) to calculate the actual demand for power by rescaling the value of maximum available power by the percentage demand signal. In some embodiments, the converter (24) is associated with the source-side circuit (1, 2, 17, 18, 20, 21). It is also envisaged that the source-side circuit (1, 2, 17, 18, 20, 21) comprises the converter (24).

In some embodiments, the system for heating and/or ventilation and/or air-conditioning comprises a source-side controller (26), the method comprising using the source-side controller (26) to produce the first flow control signal based on the value of maximum available power. In some embodiments, the method comprises the source-side controller (26) is associated with the source-side circuit (1, 2, 17, 18, 20, 21). It is also envisaged that the source-side circuit (1, 2, 17, 18, 20, 21) comprises the source-side controller (26).

In some embodiments, the source-side circuit (1, 2, 17, 18, 20, 21) comprises a valve (21), the method comprising: transmitting the first flow control signal to the valve (21); and the valve (21) controlling the flow of the fluid through the source-side circuit (1, 2, 17, 18, 20, 21) in response to the first flow control signal.

In some embodiments, the source-side circuit (1, 2, 17, 18, 20, 21) comprises a valve (21), the method comprising: transmitting the first flow control signal to the valve (21); and the valve (21) controlling the flow of the fluid through the source-side circuit (1, 2, 17, 18, 20, 21) in response to the first flow control signal such that an amount of heat transferred via the source-side circuit (1, 2, 17, 18, 20, 21) corresponds to or matches or substantially matches the value of maximum available power.

In some embodiments, the source-side circuit (1, 2, 17, 18, 20, 21) comprises a pump (2), the method comprising: transmitting the first flow control signal to the pump (2); and the pump (2) conveying the fluid through the source-side circuit (1, 2, 17, 18, 20, 21) in response to the first flow control signal.

In some embodiments, the source-side circuit (1, 2, 17, 18, 20, 21) comprises a pump (2), the method comprising: transmitting the first flow control signal to the pump (2); and the pump (2) conveying the fluid through the source-side circuit (1, 2, 17, 18, 20, 21) in response to the first flow control signal such that an amount of heat transferred via the source-side circuit (1, 2, 17, 18, 20, 21) corresponds to or matches or substantially matches the value of maximum available power.

In some embodiments, the source-side circuit (1, 2, 17, 18, 20, 21) comprises a heat pump (1, 2), the method comprising: transmitting the first flow control signal to the heat pump (1, 2); and the heat pump (1, 2) conveying the fluid through the source-side circuit (1, 2, 17, 18, 20, 21) in response to the first flow control signal.

In some embodiments, the source-side circuit (1, 2, 17, 18, 20, 21) comprises a heat pump (1, 2), the method comprising: transmitting the first flow control signal to the heat pump (1, 2); and the heat pump (1, 2) conveying the fluid through the source-side circuit (1, 2, 17, 18, 20, 21) in response to the first flow control signal such that an amount of heat transferred via the source-side circuit (1, 2, 17, 18, 20, 21) corresponds to or matches or substantially matches the value of maximum available power.

In some embodiments, the method comprises using a cooling curve to estimate the percentage demand signal as a function of the terminal-side measure of supply temperature. A cooling curve determines a demand signal such as the percentage demand signal as a function of a measure of supply temperature such as the terminal-side measure of supply temperature. A cooling curve advantageously relates a demand signal such as the percentage demand signal to a measure of supply temperature such as the terminal-side measure of supply temperature.

In some embodiments, the method comprises using a heating curve to estimate the percentage demand signal as a function of the terminal-side measure of supply temperature. A heating curve determines a demand signal such as the percentage demand signal as a function of a measure of supply temperature such as the terminal-side measure of supply temperature. A heating curve advantageously relates a demand signal such as the percentage demand signal to a measure of supply temperature such as the terminal-side measure of supply temperature.

In some embodiments, the method comprises determining the percentage demand signal as a function of the terminal-side measure of supply temperature.

In some embodiments, the method comprises using a cooling curve to determine the percentage demand signal as a function of the terminal-side measure of supply temperature.

In some embodiments, the method comprises using a heating curve to determine the percentage demand signal as a function of the terminal-side measure of supply temperature.

In some embodiments, the method comprises calculating the percentage demand signal as a function of the terminal-side measure of supply temperature.

In some embodiments, the method comprises using a cooling curve to calculate the percentage demand signal as a function of the terminal-side measure of supply temperature.

In some embodiments, the method comprises using a heating curve to calculate the percentage demand signal as a function of the terminal-side measure of supply temperature.

In some embodiments, the system for heating and/or ventilation and/or air-conditioning comprises a terminal-side controller (22), the method comprising using the terminal-side controller (22) to estimate the percentage demand signal as a function of the terminal-side measure of supply temperature.

In some embodiments, the system for heating and/or ventilation and/or air-conditioning comprises a terminal-side controller (22), the method comprising using the terminal-side controller (22) to determine the percentage demand signal as a function of the terminal-side measure of supply temperature.

In some embodiments, the system for heating and/or ventilation and/or air-conditioning comprises a terminal-side controller (22), the method comprising using the terminal-side controller (22) and a cooling curve to determine the percentage demand signal as a function of the terminal-side measure of supply temperature.

In some embodiments, the system for heating and/or ventilation and/or air-conditioning comprises a terminal-side controller (22), the method comprising using the terminal-side controller (22) and a heating curve to determine the percentage demand signal as a function of the terminal-side measure of supply temperature.

In some embodiments, the system for heating and/or ventilation and/or air-conditioning comprises a terminal-side controller (22), the method comprising using the terminal-side controller (22) to calculate the percentage demand signal as a function of the terminal-side measure of supply temperature.

In some embodiments, the system for heating and/or ventilation and/or air-conditioning comprises a terminal-side controller (22), the method comprising using the terminal-side controller (22) and a cooling curve to calculate the percentage demand signal as a function of the terminal-side measure of supply temperature.

In some embodiments, the system for heating and/or ventilation and/or air-conditioning comprises a terminal-side controller (22), the method comprising using the terminal-side controller (22) and a heating curve to calculate the percentage demand signal as a function of the terminal-side measure of supply temperature. In some embodiments, the terminal-side controller (22) is associated with the terminal-side circuit (10-12, 19). In some embodiments, the terminal-side circuit (10-12, 19) comprises the terminal-side controller (22).

In some embodiments, the method comprises using a signal indicative of a temperature set point (23) to estimate the percentage demand signal as a function of the signal indicative of a temperature set point (23).

In an embodiment having proportional and integral control, a proportional and integral controller may be employed to estimate the percentage demand signal as a function of the signal indicative of a temperature set point (23). In some embodiments, the terminal-side controller (22) comprises a proportional and integral controller.

In an embodiment having proportional and integral and derivative control, a proportional and integral and derivative controller may employed to estimate the percentage demand signal as a function of the signal indicative of a temperature set point (23). In some embodiments, the terminal-side controller (22) comprises a proportional and integral and derivative controller.

In some embodiments, the method comprises: reading a set point signal indicative of a temperature set point; producing a temperature set point from the set point signal; and estimating a percentage demand signal as a function of the terminal-side measure of supply temperature and as a function of the temperature set point.

In some embodiments, the method comprises determining a percentage demand signal as a function of the terminal-side measure of supply temperature and as a function of the temperature set point.

In some embodiments, the method comprises calculating a percentage demand signal as a function of the terminal-side measure of supply temperature and as a function of the temperature set point. In some embodiments, the system for heating and/or ventilation and/or air-conditioning comprises a terminal-side controller (22), the method comprising using the terminal-side controller (22) to estimate a percentage demand signal as a function of the terminal-side measure of supply temperature and as a function of the temperature set point.

In some embodiments, the method comprises system for heating and/or ventilation and/or air-conditioning comprises a terminal-side controller (22), the method comprising using the terminal-side controller (22) to determine a percentage demand signal as a function of the terminal-side measure of supply temperature and as a function of the temperature set point.

In some embodiments, the system for heating and/or ventilation and/or air-conditioning comprises a terminal-side controller (22), the method comprising using the terminal-side controller (22) to calculate a percentage demand signal as a function of the terminal-side measure of supply temperature and as a function of the temperature set point.

In some embodiments, the system for heating and/or ventilation and/or air-conditioning comprises a terminal-side controller (22), the method comprising using the terminal-side controller (22) and a cooling curve to estimate a percentage demand signal as a function of the terminal-side measure of supply temperature and as a function of the temperature set point.

In some embodiments, the system for heating and/or ventilation and/or air-conditioning comprises a terminal-side controller (22), the method comprising using the terminal-side controller (22) and a cooling curve to determine a percentage demand signal as a function of the terminal-side measure of supply temperature and as a function of the temperature set point.

In some embodiments, the system for heating and/or ventilation and/or air-conditioning comprises a terminal-side controller (22), the method comprising using the terminal-side controller (22) and a cooling curve to calculate a percentage demand signal as a function of the terminal-side measure of supply temperature and as a function of the temperature set point.

In some embodiments, the system for heating and/or ventilation and/or air-conditioning comprises a terminal-side controller (22), the method comprising using the terminal-side controller (22) and a heating curve to estimate a percentage demand signal as a function of the terminal-side measure of supply temperature and as a function of the temperature set point.

In some embodiments, the system for heating and/or ventilation and/or air-conditioning comprises a terminal-side controller (22), the method comprising using the terminal-side controller (22) and a heating curve to determine a percentage demand signal as a function of the terminal-side measure of supply temperature and as a function of the temperature set point.

In some embodiments, the system for heating and/or ventilation and/or air-conditioning comprises a terminal-side controller (22), the method comprising using the terminal-side controller (22) and a heating curve to calculate a percentage demand signal as a function of the terminal-side measure of supply temperature and as a function of the temperature set point.

In some embodiments, the method comprises controlling the flow of the fluid through the source-side circuit (1, 2, 17, 18, 20, 21) in accordance with the first flow control signal such that an amount of heat transferred via the source-side circuit (1, 2, 17, 18, 20, 21) corresponds to the value of maximum available power.

In some embodiments, the method comprises controlling the flow of the fluid through the source-side circuit (1, 2, 17, 18, 20, 21) in accordance with the first flow control signal such that an amount of heat transferred via the source-side circuit (1, 2, 17, 18, 20, 21) matches or substantially matches the value of maximum available power.

In some embodiments, the system for heating and/or ventilation and/or air-conditioning comprises a source-side controller (26), the method comprising using the source-side controller (26) to control the flow of the fluid through the source-side circuit (1, 2, 17, 18, 20, 21) in accordance with the first flow control signal such that an amount of heat transferred via the source-side circuit (1, 2, 17, 18, 20, 21) corresponds to the value of maximum available power.

In some embodiments, the system for heating and/or ventilation and/or air-conditioning comprises a source-side controller (26), the method comprising using the source-side controller (26) to control the flow of the fluid through the source-side circuit (1, 2, 17, 18, 20, 21) in accordance with the first flow control signal such that an amount of heat transferred via the source-side circuit (1, 2, 17, 18, 20, 21) matches or substantially matches the value of maximum available power.

In some embodiments, the method comprises if the actual demand for power is less than the value of maximum available power: producing a second flow control signal based on the actual demand for power; and controlling the flow of the fluid through the source-side circuit (1, 2, 17, 18, 20, 21) in accordance with the second flow control signal.

In some embodiments, the second flow control signal is different from the first flow control signal. The second flow control signal may be transmitted and received using a digital communication bus and a digital communication protocol. In some embodiments, the second flow control signal is a digital signal. In some embodiments, the second flow control signal comprises a digital signal.

In some embodiments, the method may use a second flow control signal, the method comprising the step of controlling the flow of the fluid through the source-side circuit (1, 2, 17, 18, 20, 21) in accordance with the second flow control signal such that an amount of heat transferred via the source-side circuit (1, 2, 17, 18, 20, 21) is below the value of maximum available power.

In some embodiments, the method may use a second flow control signal, wherein the system for heating and/or ventilation and/or air-conditioning comprises a source-side controller (26), the method comprising the step of using the source-side controller (26) to control the flow of the fluid through the source-side circuit (1, 2, 17, 18, 20, 21) in accordance with the second flow control signal such that an amount of heat transferred via the source-side circuit (1, 2, 17, 18, 20, 21) is below the value of maximum available power.

In some embodiments, the system for heating and/or ventilation and/or air-conditioning comprises a heat exchanger (16) coupling the source-side circuit (1, 2, 17, 18, 20, 21) and the terminal-side circuit (10-12, 19), the method comprising the steps of: reading a source-side supply temperature signal indicative of a supply temperature associated with the heat exchanger (16); reading a source-side return temperature signal indicative of a return temperature associated with the heat exchanger (16); reading a flow rate signal indicative of a flow rate of the fluid through the source-side circuit (1, 2, 17, 18, 20, 21); producing a source-side measure of supply temperature from the source-side supply temperature signal and a source-side measure of return temperature from the source-side return temperature signal and a flow rate measure from the flow rate signal;

estimating a current amount of heat transfer by the heat exchanger (16) based on the source-side measures of supply and return temperatures and based on the flow rate measure; comparing the current amount to the value of maximum available power; if the current amount exceeds the value of maximum available power: producing a third flow control signal based on the value of maximum available power; and controlling the flow of the fluid through the source-side circuit (1, 2, 17, 18, 20, 21) in accordance with the third flow control signal.

In some embodiments, the current amount of heat transfer is a current amount of power transfer.

In some embodiments, the third flow control signal is the same as the first flow control signal. The third flow control signal may be different from the second flow control signal. The third flow control signal may be transmitted and received using a digital communication bus and a digital communication protocol. In some embodiments, the third flow control signal is a digital signal. In some embodiments, the third flow control signal comprises a digital signal.

In some embodiments, the method uses a third flow control signal, the method comprising the step of controlling the flow of the fluid through the source-side circuit (1, 2, 17, 18, 20, 21) in accordance with the third flow control signal such that an amount of heat transferred via the source-side circuit (1, 2, 17, 18, 20, 21) corresponds to the value of maximum available power.

In some embodiments, the method uses a third flow control signal, the method comprising the step of controlling the flow of the fluid through the source-side circuit (1, 2, 17, 18, 20, 21) in accordance with the third flow control signal such that an amount of heat transferred via the source-side circuit (1, 2, 17, 18, 20, 21) matches or substantially matches the value of maximum available power.

In some embodiments, the method uses a third flow control signal, wherein the system for heating and/or ventilation and/or air-conditioning comprises a source-side controller (26), the method comprising the step of using the source-side controller (26) to control the flow of the fluid through the source-side circuit (1, 2, 17, 18, 20, 21) in accordance with the third flow control signal such that an amount of heat transferred via the source-side circuit (1, 2, 17, 18, 20, 21) corresponds to the value of maximum available power.

In some embodiments, the method uses a third flow control signal, wherein the system for heating and/or ventilation and/or air-conditioning comprises a source-side controller (26), the method comprising the step of using the source-side controller (26) to control the flow of the fluid through the source-side circuit (1, 2, 17, 18, 20, 21) in accordance with the third flow control signal such that an amount of heat transferred via the source-side circuit (1, 2, 17, 18, 20, 21) matches or substantially matches the value of maximum available power.

In some embodiments, the method uses a third flow control signal, the method comprising the steps of: determining a difference between the source-side measure of supply temperature and the source-side measure of return temperature; and estimating a current amount of heat transfer by the heat exchanger (16) based on the determined difference and based on the flow rate measure.

In some embodiments, the method uses a third flow control signal, the method comprising the steps of: calculating a difference between the source-side measure of supply temperature and the source-side measure of return temperature; and estimating a current amount of heat transfer by the heat exchanger (16) based on the calculated difference and based on the flow rate measure.

In some embodiments, the method includes a third flow control signal, the method comprising the steps of: determining a difference between the source-side measure of supply temperature and the source-side measure of return temperature; and determining a current amount of heat transfer by the heat exchanger (16) based on the determined difference and based on the flow rate measure.

In some embodiments, the method uses a third flow control signal, the method comprising the steps of: calculating a difference between the source-side measure of supply temperature and the source-side measure of return temperature; and determining a current amount of heat transfer by the heat exchanger (16) based on the calculated difference and based on the flow rate measure.

In some embodiments, the method uses a third flow control signal, the method comprising the steps of: calculating a difference between the source-side measure of supply temperature and the source-side measure of return temperature; and calculating a current amount of heat transfer by the heat exchanger (16) based on the calculated difference and based on the flow rate measure.

In some embodiments, the method uses a determined difference, the method comprising the step of estimating a current amount of heat transfer by the heat exchanger (16) based on a product of the determined difference and of the flow rate measure.

In some embodiments, the method uses a third flow control signal, the method comprising the steps of: determining a difference between the source-side measure of supply temperature and the source-side measure of return temperature; and determining a current amount of heat transfer by the heat exchanger (16) based on a product of the determined difference and of the flow rate measure.

In some embodiments, the methods use a third flow control signal, the method comprising the steps of: calculating a difference between the source-side measure of supply temperature and the source-side measure of return temperature; and determining a current amount of heat transfer by the heat exchanger (16) based on a product of the calculated difference and of the flow rate measure.

In some embodiments, the method uses a third flow control signal, the method comprising the steps of: calculating a difference between the source-side measure of supply temperature and the source-side measure of return temperature; and calculating a current amount of heat transfer by the heat exchanger (16) based on a product of the calculated difference and of the flow rate measure.

In some embodiments, the method uses a third flow control signal, the method comprising the steps of: determining a difference between the source-side measure of supply temperature and the source-side measure of return temperature; and calculating a current amount of heat transfer by the heat exchanger (16) based on a product of the determined difference and of the flow rate measure.

In some embodiments, the method uses a third flow control signal, the method comprising the steps of: calculating a difference between the source-side measure of supply temperature and the source-side measure of return temperature; and estimating a current amount of heat transfer by the heat exchanger (16) based on a product of the calculated difference and of the flow rate measure.

In some embodiments, there is a method of controlling heat exchange via a terminal unit (10-12) of a terminal-side circuit (10-12, 19) of a system for heating and/or ventilation and/or air-conditioning, the system for heating and/or ventilation and/or air-conditioning also comprising a source-side circuit (1, 2, 17, 18, 20, 21) coupled to the terminal-side circuit (10-12, 19), the method comprising the steps of: reading a terminal-side supply temperature signal indicative of a supply temperature associated with the terminal unit (10-12); producing a terminal-side measure of supply temperature from the terminal-side supply temperature signal; estimating a percentage demand signal as a function of the terminal-side measure of supply temperature; estimating an actual demand for power by rescaling a value of maximum available power by the percentage demand signal; comparing the actual demand for power to the value of maximum available power; if the actual demand for power exceeds the value of maximum available power: producing a fourth flow control signal based on the value of maximum available power; and controlling a flow of a fluid through the terminal unit (10-12) in accordance with the fourth flow control signal.

In some embodiments, the fourth flow control signal is different from the first flow control signal. The fourth flow control signal may also be different from the second flow control signal. The fourth flow control signal may be different from the third flow control signal.

In some embodiments, the method uses a fourth flow control signal, the method comprising the steps of: transmitting the fourth flow control signal to the terminal unit (10-12); and the terminal unit (10-12) receiving the fourth flow control signal.

The fourth flow control signal may be transmitted and received using a digital communication bus and a digital communication protocol. In some embodiments, the fourth flow control signal is a digital signal. In some embodiments, the fourth flow control signal comprises a digital signal.

In some embodiments, the fourth flow control signal causes the terminal unit (10-12) to reduce a flow rate of the fluid through the terminal unit (10-12). In some embodiments, the terminal unit (10-12) comprises a valve and the fourth flow control signal causes the valve of the terminal unit (10-12) to reduce a flow rate of the fluid through the terminal unit (10-12).

In some embodiments, there is a method of controlling heat exchange via a terminal unit (10-12) of a terminal-side circuit (10-12, 19) of a system for heating and/or ventilation and/or air-conditioning, the system for heating and/or ventilation and/or air-conditioning also comprising a source-side circuit (1, 2, 17, 18, 20, 21) coupled to the terminal-side circuit (10-12, 19), the method comprising the steps of: reading a terminal-side supply temperature signal indicative of a supply temperature associated with the terminal unit (10-12); producing a terminal-side measure of supply temperature from the terminal-side supply temperature signal; estimating a percentage demand signal as a function of the terminal-side measure of supply temperature; estimating an actual demand for power by rescaling a value of maximum available power by the percentage demand signal; comparing the actual demand for power to the value of maximum available power; if the actual demand for power is less than the value of maximum available power: recording a signal indicative of outside temperature; producing a measure of outside temperature from the signal indicative of outside temperature; determining a relative power increase based on the measure of outside temperature; producing a fifth flow control signal based on the relative power increase; and controlling a flow of a fluid through the terminal unit (10-12) in accordance with the fifth flow control signal.

In some embodiments, the fifth flow control signal is different from the first flow control signal. In some embodiments, the fifth flow control signal is also different from the second flow control signal. In some embodiments, the fifth flow control signal is different from the third flow control signal and from the fourth flow control signal.

In some embodiments, the method uses a fifth flow control signal, the method comprising the steps of: transmitting the fifth flow control signal to the terminal unit (10-12); and the terminal unit (10-12) receiving the fifth flow control signal. In some embodiments, the fifth flow control signal is transmitted and received using a digital communication bus and a digital communication protocol. In some embodiments, the fifth flow control signal is a digital signal. In some embodiments, the fifth flow control signal comprises a digital signal.

In some embodiments, the fifth flow control signal causes the terminal unit (10-12) to reduce a flow rate of the fluid through the terminal unit (10-12). In some embodiments, the terminal unit (10-12) comprises a valve and the fifth flow control signal causes the valve of the terminal unit (10-12) to reduce a flow rate of the fluid through the terminal unit (10-12).

In some embodiments, a system comprises: a source-side controller (26) and a terminal-side controller (22), the terminal-side controller (22) being different from the source-side controller (26); the terminal-side controller (22) being configured to: read a terminal-side supply temperature signal indicative of a supply temperature from a temperature sensor (19) associated with a terminal unit (10-12) for heating and/or ventilation and/or air-conditioning; produce a terminal-side measure of supply temperature from the terminal-side supply temperature signal; estimate a percentage demand signal as a function of the terminal-side measure of supply temperature; transmit the percentage demand signal to the source-side controller (26); the source-side controller (26) being configured to: receive the percentage demand signal from the source-side controller (26); read a signal indicative of maximum available power; produce a value of maximum available power from the signal indicative of maximum available power; estimate an actual demand for power by rescaling the value of maximum available power by the percentage demand signal; compare the actual demand for power to the value of maximum available power; if the actual demand for power exceeds the value of maximum available power: produce a first flow control signal based on the value of maximum available power; and transmit the first flow control signal to a flow regulator (1, 2, 21) of a heating and/or ventilation and/or air-conditioning circuit (1, 2, 17, 18, 20, 21).

In some embodiments, the terminal-side controller (22) comprises a memory storing a value of maximum available power, the terminal-side controller (22) being configured to: read the value of maximum available power from the memory; and estimate an actual demand for power by rescaling the value of maximum available power by the percentage demand signal.

In some embodiments, the terminal-side controller (22) comprises a memory storing a cooling curve, the terminal-side controller (22) being configured to: read the cooling curve from the memory; and use the cooling curve to estimate the percentage demand signal as a function of the terminal-side measure of supply temperature. A cooling curve determines a demand signal such as the percentage demand signal as a function of a measure of supply temperature such as the terminal-side measure of supply temperature. A cooling curve relates a demand signal such as the percentage demand signal to a measure of supply temperature such as the terminal-side measure of supply temperature.

In some embodiments, the terminal-side controller (22) comprises a memory storing a heating curve, the terminal-side controller (22) being configured to: read the heating curve from the memory; and use the heating curve to estimate the percentage demand signal as a function of the terminal-side measure of supply temperature. A heating curve determines a demand signal such as the percentage demand signal as a function of a measure of supply temperature such as the terminal-side measure of supply temperature. A heating curve relates a demand signal such as the percentage demand signal to a measure of supply temperature such as the terminal-side measure of supply temperature.

In some embodiments, the source-side controller (26) comprises a converter (24). In some embodiments, the source-side controller (26) comprises a scaling unit.

In some embodiments, the flow regulator (1, 2, 21) is selected from at least one of: a valve (21) and/or a pump (2) and/or a heat pump (1, 2). In some embodiments, the flow regulator (1, 2, 21) is a source-side flow regulator (1, 2, 21).

In some embodiments, the heating and/or ventilation and/or air-conditioning circuit (1, 2, 17, 18, 20, 21) is a source-side circuit (1, 2, 17, 18, 20, 21) of a system for heating and/or ventilation and/or air-conditioning. In some embodiments, the heating and/or ventilation and/or air-conditioning circuit (1, 2, 17, 18, 20, 21) is a first circuit (1, 2, 17, 18, 20, 21) of a system for heating and/or ventilation and/or air-conditioning.

Different controllers (22, 26) for source-side purposes and for terminal-side purposes afford dedicated controllers for such purposes. Dedicated controllers (22, 26) instead of general-purpose controllers (22, 26) reduce the overall complexity of the system.

In some embodiments, there is a terminal-side controller (22) and a source-side controller (26), wherein the source-side controller (26) is configured to transmit the first flow control signal to a flow regulator (1, 2, 21) of a heating and/or ventilation and/or air-conditioning circuit (1, 2, 17, 18, 20, 21), the first flow control signal causing the flow regulator (1, 2, 21) to control the flow of the fluid through the heating and/or ventilation and/or air-conditioning circuit (1, 2, 17, 18, 20, 21) such that an amount of heat transferred via the heating and/or ventilation and/or air-conditioning circuit (1, 2, 17, 18, 20, 21) matches or substantially matches the value of maximum available power.

In some embodiments, there is a terminal-side controller (22) and a source-side controller (26), wherein the source-side controller (26) is configured to transmit the first flow control signal to a flow regulator (1, 2, 21) of a heating and/or ventilation and/or air-conditioning circuit (1, 2, 17, 18, 20, 21), the first flow control signal causing the flow regulator (1, 2, 21) to regulate the flow of the fluid through the heating and/or ventilation and/or air-conditioning circuit (1, 2, 17, 18, 20, 21) such that an amount of heat transferred via the heating and/or ventilation and/or air-conditioning circuit (1, 2, 17, 18, 20, 21) matches or substantially matches the value of maximum available power.

In some embodiments, there is a terminal-side controller (22) and a source-side controller (26), wherein the source-side controller (26) is configured to transmit the first flow control signal to a flow regulator (1, 2, 21) of a heating and/or ventilation and/or air-conditioning circuit (1, 2, 17, 18, 20, 21), the first flow control signal causing the flow regulator (1, 2, 21) to set the flow of the fluid through the heating and/or ventilation and/or air-conditioning circuit (1, 2, 17, 18, 20, 21) such that an amount of heat transferred via the heating and/or ventilation and/or air-conditioning circuit (1, 2, 17, 18, 20, 21) matches or substantially matches the value of maximum available power.

In some embodiments, there is a terminal-side controller (22) and a source-side controller (26) comprising a terminal-side controller (22) and a source-side controller (26), wherein the system comprises the flow regulator (1, 2, 21).

In some embodiments, there is a terminal-side controller (22) and a source-side controller (26), wherein the system comprises a system controller (15) having a system on a chip; wherein the terminal-side controller (22) is arranged on the system on a chip of the system controller (15); and wherein the source-side controller (26) is arranged on the system on a chip of the system controller (15). A system on a chip comprising the source-side controller (26) and the terminal-side controller (22) enables a compact solution.

In some embodiments, there is a terminal-side controller (22) and a source-side controller (26), wherein the system comprises a system controller (15) running a first isolated user space instance and a second isolated user space instance, the first isolated user space instance being different from the second isolated user space instance, the first isolated user space instance being in operative communication with the second isolated user space instance; wherein the first isolated user space instance comprises the terminal-side controller (22); and wherein the second isolated user space instance comprises the source-side controller (26).

In some embodiments, the first isolated user space instance is a first container and the second isolated user space instance is a second container. In some embodiments, the first isolated user space instance is a first virtual server such as a first virtual private server and the second isolated user space instance is a second virtual server such as a second virtual private server. In some embodiments, the first isolated user space instance is a first isolated user space process and the second isolated user space instance is a second isolated user space process. In some embodiments, the first isolated user space instance is in operative communication with the second isolated user space instance using a communication bus protocol and a communication bus. Operating system level virtualisation enables source-side controllers (26) and terminal-side controllers (22) that can be started and stopped independently from one another. A system using operating system level virtualisation becomes more robust. A system using operating system level virtualisation also affords transfer of first and second isolated user space instances from one system controller (15) to another system controller (15).

In some embodiments, there is a computer program product comprising instructions which, when the program is executed by any of the aforementioned systems comprising a terminal-side controller (22) and a source-side controller (26), cause the system to carry out the steps of any of the aforementioned methods.

In some embodiments, there is a system for heating and/or ventilation and/or air-conditioning comprising a system controller (15) and a camera in operative communication with the system controller (15) and a terminal unit (10-12) in operative communication with the system controller (15), wherein the camera is configured to: record an image of a space such as a room of a building or such as an entrance to a room of a building; produce image data from the recorded image; transmit the image data to the processor; wherein the system controller (15) is configured to: receive the image data; determine a facial identity from the image data; determine a set point temperature based on the facial identity; and control the terminal unit (10-12) based on the set point temperature.

In some embodiments, the system controller (15) is configured to: map the determined facial identity to an occupant's identity; and determine a set point temperature based on the occupant's identity. The system controller (15) can comprise a memory such as a non-volatile memory storing one or more occupant identities.

In some embodiments, the camera comprises an optical camera such as an infrared camera. The system controller (15) can comprise a cloud computer. The image data ideally are digital image data. The system controller (15) advantageously employs artificial intelligence such as a trained neural network to determine the facial identity from the image data.

It should be understood that the foregoing relates only to certain embodiments of the teachings of this disclosure and that numerous changes can be made therein without departing from the scope of the disclosure. It should also be understood that the disclosure is not restricted to the illustrated embodiments and that various modifications can be made within the scope thereof.

REFERENCE NUMERALS 1 source
2 (electric) pump
3 conduits
4, 5, 6 loops
7, 8, 9 (electromechanical) valves
10, 11, 12 terminal units or groups of terminal units
13, 14 branches
15 (system) controller
16 heat exchanger
17 sensor
18 sensor
19 sensor
20 meter
21 valve
22 controller
23 signal indicative of set point temperature
24 converter
25 signal indicative of maximum available power
26 controller
27 design outside temperature (outside temperature low)
28 outside temperature high
29 outside air temperature
30 relative power increase
31 momentarily provided power in units of rated power

The invention claimed is:

1. A method of controlling heat exchange via a terminal unit of a terminal-side circuit of a system for heating and/or ventilation and/or air-conditioning with a source-side circuit coupled to the terminal-side circuit, the method comprising:
reading a terminal-side supply temperature signal indicative of a supply temperature of the terminal unit;
producing a terminal-side measure of supply temperature from the terminal-side supply temperature signal;
estimating a percentage demand signal as a function of the terminal-side measure of supply temperature;
estimating an actual demand for power by rescaling a value of maximum available power by the percentage demand signal;
comparing the actual demand for power to the value of maximum available power;
if the actual demand for power exceeds the value of maximum available power: producing a first flow control signal based on the value of maximum available power; and controlling a flow of a fluid through the source-side circuit based on the first flow control signal; and
if the actual demand for power is less than the value of maximum available power: producing a second flow control signal based on the actual demand for power;

and controlling the flow of the fluid through the source-side circuit in accordance with the second flow control signal.

2. The method according to claim 1, the method further comprising using a cooling curve to estimate the percentage demand signal as a function of the terminal-side measure of supply temperature.

3. The method according to claim 1, the method further comprising using a heating curve to estimate the percentage demand signal as a function of the terminal-side measure of supply temperature.

4. The method according to claim 1, the method further comprising:
reading a set point signal indicative of a temperature set point;
producing a temperature set point from the set point signal; and
estimating a percentage demand signal as a function of the terminal-side measure of supply temperature and as a function of the temperature set point.

5. The method according to claim 1, the method further comprising controlling the flow of the fluid through the source-side circuit in accordance with the first flow control signal such that an amount of heat transferred via the source-side circuit corresponds to the value of maximum available power.

6. The method according to claim 1, wherein the system for heating and/or ventilation and/or air-conditioning comprises a heat exchanger coupling the source-side circuit and the terminal-side circuit;
wherein the method further comprises:
reading a source-side supply temperature signal indicative of a supply temperature associated with the heat exchanger;
reading a source-side return temperature signal indicative of a return temperature associated with the heat exchanger;
reading a flow rate signal indicative of a flow rate of the fluid through the source-side circuit;
producing a source-side measure of supply temperature from the source-side supply temperature signal and a source-side measure of return temperature from the source-side return temperature signal and a flow rate measure from the flow rate signal;
estimating a current amount of heat transfer by the heat exchanger based on the source-side measures of supply and return temperatures and based on the flow rate measure;
comparing the current amount to the value of maximum available power; and
if the current amount exceeds the value of maximum available power: producing a third flow control signal based on the value of maximum available power; and controlling the flow of the fluid through the source-side circuit in accordance with the third flow control signal.

7. The method according to claim 6, the method further comprising:
determining a difference between the source-side measure of supply temperature and the source-side measure of return temperature; and
estimating a current amount of heat transfer by the heat exchanger based on the determined difference and based on the flow rate measure.

8. The method according to claim 7, the method further comprising estimating a current amount of heat transfer by the heat exchanger based on a product of the determined difference and of the flow rate measure.

9. A computer program comprising instructions which, when the program is executed by a computer, cause the computer to carry out a method comprising:
reading a terminal-side supply temperature signal indicative of a supply temperature of the terminal unit;
producing a terminal-side measure of supply temperature from the terminal-side supply temperature signal;
estimating a percentage demand signal as a function of the terminal-side measure of supply temperature;
estimating an actual demand for power by rescaling a value of maximum available power by the percentage demand signal;
comparing the actual demand for power to the value of maximum available power;
if the actual demand for power exceeds the value of maximum available power: producing a first flow control signal based on the value of maximum available power; and controlling a flow of a fluid through the source-side circuit based on the first flow control signal; and
if the actual demand for power is less than the value of maximum available power: producing a second flow control signal based on the actual demand for power; and controlling the flow of the fluid through the source-side circuit in accordance with the second flow control signal.

10. A system comprising:
a source-side controller; and
a terminal-side controller programmed to:
read a terminal-side supply temperature signal indicative of a supply temperature from a temperature sensor associated with a terminal unit for heating and/or ventilation and/or air-conditioning;
produce a terminal-side measure of supply temperature from the terminal-side supply temperature signal;
estimate a percentage demand signal as a function of the terminal-side measure of supply temperature;
transmit the percentage demand signal to the source-side controller;
the source-side controller programmed to:
receive the percentage demand signal from the terminal-side controller;
read a signal indicative of maximum available power;
produce a value of maximum available power from the signal indicative of maximum available power;
estimate an actual demand for power by rescaling the value of maximum available power by the percentage demand signal;
compare the actual demand for power to the value of maximum available power; and
if the actual demand for power exceeds the value of maximum available power: produce a first flow control signal based on the value of maximum available power; and transmit the first flow control signal to a flow regulator of a heating and/or ventilation and/or air-conditioning circuit; and
if the actual demand for power is less than the value of maximum available power: producing a second flow control signal based on the actual demand for power; and controlling the flow of the fluid through the source-side circuit in accordance with the second flow control signal.

11. The system according to claim 10, wherein the source-side controller is programmed to transmit the first flow control signal to a flow regulator of a heating and/or ventilation and/or air-conditioning circuit, the first flow control signal causing the flow regulator to control the flow of the fluid through the heating and/or ventilation and/or air-conditioning circuit such that an amount of heat transferred via the heating and/or ventilation and/or air-conditioning circuit matches or substantially matches the value of maximum available power.

12. The system according to claim 10, the system further comprising a system controller having a system on a chip;
   wherein the terminal-side controller is arranged on the system on a chip of the system controller; and
   the source-side controller is arranged on the system on a chip of the system controller.

13. The system according to claim 10, further comprising a system controller running a first isolated user space instance and a second isolated user space instance, the first isolated user space instance being different from the second isolated user space instance, the first isolated user space instance being in operative communication with the second isolated user space instance;
   wherein the first isolated user space instance comprises the terminal-side controller; and
   wherein the second isolated user space instance comprises the source-side controller.

\* \* \* \* \*